(12) United States Patent
Rhoads et al.

(10) Patent No.: US 8,224,018 B2
(45) Date of Patent: Jul. 17, 2012

(54) SENSING DATA FROM PHYSICAL OBJECTS

(75) Inventors: Geoffrey B. Rhoads, West Linn, OR (US); Tony F. Rodriguez, Portland, OR (US)

(73) Assignee: Digimarc Corporation, Beaverton, OR (US)

( * ) Notice: Subject to any disclaimer, the term of this patent is extended or adjusted under 35 U.S.C. 154(b) by 1209 days.

(21) Appl. No.: 11/739,387

(22) Filed: Apr. 24, 2007

(65) Prior Publication Data

US 2008/0112596 A1 May 15, 2008

Related U.S. Application Data

(63) Continuation-in-part of application No. 11/625,162, filed on Jan. 19, 2007.

(60) Provisional application No. 60/762,055, filed on Jan. 23, 2006, provisional application No. 60/866,033, filed on Nov. 15, 2006.

(51) Int. Cl.
*G06K 9/00* (2006.01)
(52) U.S. Cl. .................... 382/100; 382/108
(58) Field of Classification Search .................... 382/100
See application file for complete search history.

(56) References Cited

U.S. PATENT DOCUMENTS

| | | | |
|---|---|---|---|
| 4,423,415 A | 12/1983 | Goldman | |
| 4,501,439 A | 2/1985 | Antes | |
| 4,568,936 A | 2/1986 | Goldman | |
| 4,675,669 A | 6/1987 | Goldman | |
| 4,677,435 A | 6/1987 | D'Agraives et al. | |
| 5,196,906 A | 3/1993 | Stover et al. | |
| 5,325,167 A | 6/1994 | Melen | |
| 5,344,192 A | 9/1994 | Phillips | |
| 5,521,984 A | 5/1996 | Denenberg | |
| 6,122,403 A | 9/2000 | Rhoads | |
| 6,546,416 B1 * | 4/2003 | Kirsch | 709/206 |
| 6,584,214 B1 | 6/2003 | Pappu | |
| 6,614,914 B1 | 9/2003 | Rhoads et al. | |
| 6,947,571 B1 | 9/2005 | Rhoads et al. | |
| 6,987,568 B2 | 1/2006 | Dana | |
| 7,162,035 B1 | 1/2007 | Durst | |
| 7,251,347 B2 | 7/2007 | Smith | |
| 2002/0021003 A1 | 2/2002 | McGrew | |

(Continued)

FOREIGN PATENT DOCUMENTS

GB 2417592 3/2006

(Continued)

OTHER PUBLICATIONS

Buchanan, Fingerprinting documents and packaging—supplementary methods, Nature online, Jul. 2005.

(Continued)

*Primary Examiner* — Hadi Akhavannik
(74) *Attorney, Agent, or Firm* — Digimarc Corporation

(57) ABSTRACT

Directional albedo of a particular article, such as an identity card, is measured and stored. When the article is later presented, it can be confirmed to be the same particular article by re-measuring the albedo function, and checking for correspondence against the earlier-stored data. The re-measuring can be performed through us of a handheld optical device, such as a camera-equipped cell phone. The albedo function can serve as random key data in a variety of cryptographic applications. The function can be changed during the life of the article. A variety of other features are also detailed.

18 Claims, 9 Drawing Sheets

U.S. PATENT DOCUMENTS

| | | |
|---|---|---|
| 2002/0080357 A1 | 6/2002 | Dana |
| 2002/0171840 A1 | 11/2002 | Davis |
| 2003/0063772 A1 | 4/2003 | Smith |
| 2003/0219145 A1* | 11/2003 | Smith .......................... 382/100 |
| 2004/0036882 A1 | 2/2004 | Perlin |
| 2004/0129450 A1 | 7/2004 | Yamazaki |
| 2004/0158724 A1* | 8/2004 | Carr et al. ..................... 713/186 |
| 2004/0262400 A1 | 12/2004 | Chang |
| 2005/0038756 A1 | 2/2005 | Nagel |
| 2005/0045729 A1 | 3/2005 | Yamazaki |
| 2006/0088946 A1 | 4/2006 | Willson |
| 2006/0092412 A1 | 5/2006 | Doshoda |
| 2006/0115110 A1 | 6/2006 | Rodriguez et al. |
| 2006/0200672 A1 | 9/2006 | Calhoon |
| 2006/0294583 A1 | 12/2006 | Cowburn |
| 2007/0025619 A1 | 2/2007 | Cowburn |
| 2007/0027819 A1 | 2/2007 | Cowburn |
| 2007/0028093 A1 | 2/2007 | Cowburn |
| 2007/0028108 A1 | 2/2007 | Cowburn |
| 2007/0165208 A1 | 7/2007 | Cowburn |
| 2007/0192850 A1 | 8/2007 | Cowburn |
| 2008/0002243 A1 | 1/2008 | Cowburn |
| 2008/0044096 A1 | 2/2008 | Cowburn |
| 2008/0141364 A1 | 6/2008 | Skoric |
| 2008/0149700 A1 | 6/2008 | Tuyls |
| 2008/0149820 A1 | 6/2008 | Jordan |
| 2008/0159529 A1 | 7/2008 | Aarts |
| 2008/0164689 A1 | 7/2008 | Jordan |
| 2008/0210757 A1 | 9/2008 | Burden |
| 2008/0229119 A1 | 9/2008 | Skoric |
| 2008/0260199 A1 | 10/2008 | Cowburn |
| 2008/0294900 A1 | 11/2008 | Cowburn |
| 2009/0008924 A1 | 1/2009 | Ophey |
| 2009/0153841 A1 | 6/2009 | Ophey |
| 2009/0218401 A1 | 9/2009 | Burden |
| 2010/0122093 A1 | 5/2010 | Tuyls |

FOREIGN PATENT DOCUMENTS

| | | |
|---|---|---|
| WO | WO9724699 | 7/1997 |
| WO | WO0065541 | 11/2000 |
| WO | WO0070585 | 11/2000 |
| WO | WO0154077 | 7/2001 |
| WO | WO02065782 | 8/2002 |
| WO | WO03030105 | 4/2003 |
| WO | WO03087991 | 10/2003 |
| WO | WO2004013817 | 2/2004 |
| WO | WO2005088533 | 9/2005 |
| WO | WO2005106783 | 11/2005 |
| WO | WO2006016112 | 2/2006 |
| WO | WO2006120398 | 11/2006 |
| WO | WO2007087498 | 8/2007 |

OTHER PUBLICATIONS

Buchanan, Fingerprinting documents and packaging, Nature vol. 436, p. 475, Jul. 28, 2005.

Haist, Optical Detection of Random Features for High Security Applications, Optics Communications v. 147. pp. 173-179, 1998.

Lindstrand, Angularly and Spatially Resolved Reflectometer for a Perceptually Adequate Characterization of Gloss, JIST vol. 49, Jan.-Feb. 2005, pp. 71-84.

Pappu, Physical One-Way Functions, RSA Laboratories Cryptobytes. vol. 6, No. 2, Summer, 2003, pp. 21-32.

Skoric, Robust Key Extraction from Physical Uncloncable Functions, Springer Verlag, LNCS 3531, pp. 407-422, 2005.

AlpVision Fingerprint press release, Sep. 25, 2006.

Chen, "Certifying Authenticity via Fiber-Infused Paper," ACM SIGecom Exchanges, vol. 5, Issue 3, Apr. 2005, pp. 29-37.

Matsumoto, "Evaluation Security of a Clone Preventive Technique," Optical Security and Counterfeit Deterrence Techniques III, Proc. of SPIE Co. 3973, 2000, pp. 139-152.

Pappu, Physical One-Way Functions, Science, vol. 297, Sep. 2002. pp. 2026-2030.

Pappu, "Physical One-Way Functions," MIT Thesis, Mar. 2001.

Rodriguez, "On the use of Mobile Imaging Devices for the Validation of First- and Second-Line Security Features," SPIE vol. 6075, Feb. 2006.

Van Renesse, "3DAS—A 3 Dimensional-Structure Authentication System," IEE European Convention on Security and Detection, 1995, pp. 45-49.

Van Renesse, "Optical Inspection Techniques for Security Instrumentation," SPIE vol. 2659, 159-167, 1996.

WO07087498 search report and written opinion dated Dec. 6, 2007.

* cited by examiner

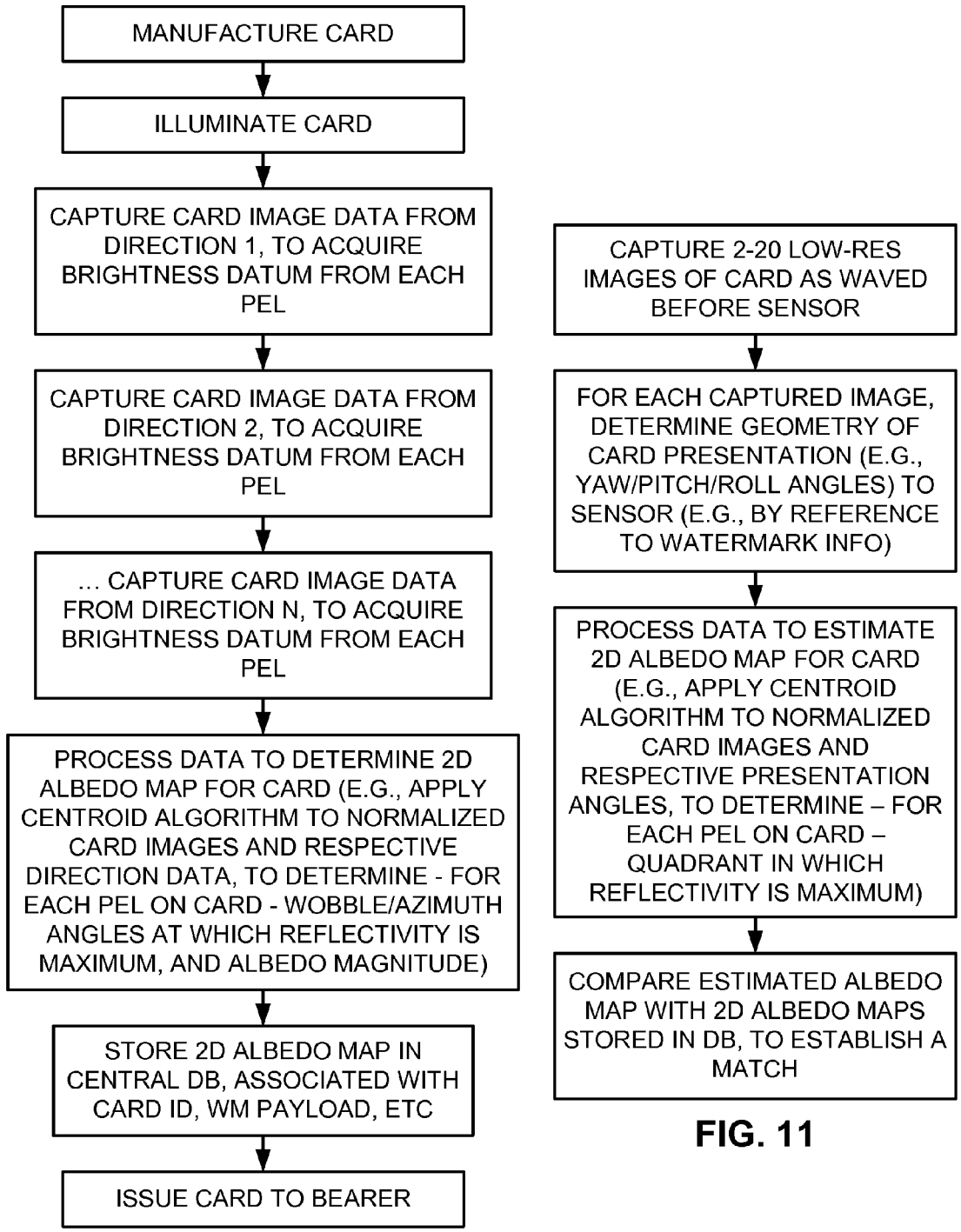

(before deformation)

(after laser deformation)

SENSING DATA FROM PHYSICAL OBJECTS

RELATED APPLICATION DATA

This application is a continuation-in-part of application Ser. No. 11/625,162, filed Jan. 19, 2007, which claims priority benefit to provisional applications 60/762,055, filed Jan. 23, 2006, and 60/866,033, filed Nov. 15, 2006.

FIELD

The technology detailed herein relates—in certain aspects—to sensing optical data from an object, and uses of the resulting data.

BACKGROUND

The following references detail technologies applicable in connection with applicants' work.

U.S. Pat. No. 6,584,214 discloses how three-dimensional characteristics of a complex physical structure can be used to generate a unique identifier useful, e.g., in cryptography. In effect, the physical characteristics represent the basis of a "physical one-way hash function" that facilitates derivation of an identifier based on the structure (yet the structure cannot be reproduced given only the identifier).

Related work is detailed in the March, 2001, MIT thesis by Pappu, entitled "Physical One-Way Functions," and in the related Pappu et al paper of the same name, published in the Sep. 20, 2002, issue of Science (Vol. 297, pp. 2026-2030).

Chen et al have noted that an inexpensive physical object can serve as a cryptographic element, if a random unique structure of the object (e.g., paper fiber) is accurately quantified. ("Certifying Authenticity via Fiber-Infused Paper," ACM SIGecom Exchanges, Volume 5, Issue 3, April 2005, pages 29-37.)

Rodriguez et al have written about use of cell phones and like devices for validation of document security features. ("On the Use of Mobile Imaging Devices for the Validation of First- and Second-Line Security Features," SPIE Vol. 6075, February, 2006.)

WIPO patent publication WO 2005/106783 details how the propagation of sonic vibrations through an inhomogeneous medium—such as a card with embedded irregularities—can generate data by which the medium can be uniquely identified.

A number of patent documents teach how a medium can be uniquely identified by reference to its inherent physical characteristics, such microscopic grain structure, optical characteristics, or structural characteristics. Examples include US20050190914, US20050210255, US20030035564, US20050262350, WO0065541, WO03030105 (corresponding, e.g., to U.S. applications 60/317,665, and 60/394,914), and WO03087991 (corresponding, e.g., to 60/371,073).

Arrangements in which data is represented by reference to angles (e.g., angular symbologies) are taught, e.g., in US2003026448 and US20050285761.

U.S. Pat. No. 6,987,568 details a method and apparatus for measuring bi-directional reflectance distribution function.

U.S. Pat. No. 6,421,453 shows that gestures can be employed in identification applications.

To provide a comprehensive disclosure without unduly lengthening this specification, the documents identified herein (both above and below) are incorporated by reference.

DISCUSSION

The term "secure document" conjures various concepts to the artisan, generally characterized by expensive production materials and machinery. Examples include currency formed on commercially unobtainable paper and intaglio-engraved with elaborate guilloche patterns, and driver licenses incorporating sophisticated laminates and myriad other anti-counterfeiting technologies.

More generally, however, a secure document is simply one that essentially cannot be duplicated.

Contrary to familiar notions, in one sense all documents are secure. At an atomic level, no document can be "duplicated." If, e.g., an original driver license could be atomically characterized at the time of its issuance, and the resulting massive data set stored, then this stored data could later be used as a reference to determine whether a suspect license is the original one, or an imperfect forgery.

A system built on such principles is, of course, impractical. One hurdle is to characterize the license—at the time of its issuance—at the atomic level. If such equipment existed, it would be extraordinarily expensive. A second hurdle is more confounding: similar equipment would have to be installed at every reader location (retail outlet, airline check-in, police cruiser, etc) at which authenticity of the license is to be assessed.

However, the insight that every document (indeed, every tangible article) is irreproducible at some level, allows for some interesting inquiries.

For example, how much data must be collected from an article to permit it to be distinguished from seemingly identical articles (e.g., articles produced sequentially using the same manufacturing equipment and using same source of raw materials)? Can sufficient data be collected optically, or is resort to characterizing other physical properties (chemical composition, mechanical features) required?

Consider an ID card, measuring 3.5"×2." If optically scanned at the time of its issuance using a 600 dpi scanner, it produces 360,000 samples over each square inch. If each sample is composed of 12 bits of red information, 12 bits of blue information, and 12 bits of green information, the scanning process yield 12,960,000 bits for each square inch, or 90,720,000 bits across the face of the card. This data could be stored and used as a check to determine whether a suspect card is the original. Yet experience suggests that this nearly 100 megabit data set is not sufficiently detailed for such card authentication. A counterfeiter with such a scanner and a decent printer could produce a forged card that cannot be reliably distinguished from the original (using traditional techniques) by reference to this 100 megabit data set (taking into account a margin of natural variability associated with scanner noise and other factors, i.e., the same scanner, scanning the same article twice in succession, does not produce two identical data sets, e.g., due to shot noise and other phenomena; ultimately, a formalized Bayesian decision and/or digital hash comparison process can better define the word "distinguish" in a practical setting, but for the purposes of this general introduction, this word is sufficient).

Higher resolution scanning might be employed to generate a still larger set of characterization data, but the associated costs of deploying high resolution scanners to a large number of reading stations soon makes such approaches impractical. Moreover, as scanning resolution is increased, it becomes increasingly difficult to determine whether a difference in data sets is due to different cards, or something as simple as scanner noise.

Thus, flat-scan optical characterization of the spectral density of a card or document does not appear sufficient; resort to other physical properties—and their precise characterization would appear to be required.

Or so it would seem.

Actually, the desired results may be achieved by counter-intuitive approaches. For example, instead of looking more closely at a suspect card—look at it from further away. Likewise, instead of examining the card under tightly controlled measurement conditions, sense it in a largely uncontrolled environment. And, to top things off, use a simple optical sensor. (What first appears like a recipe for disaster might instead be the seeds for success.)

In accordance with one aspect of the technology detailed herein, a simple optical sensor is used to capture sufficient data from a card to uniquely distinguish the card from another, even if both cards are designed to be identical, and are produced sequentially from the same machine.

BRIEF DESCRIPTION OF THE DRAWINGS

FIG. 7 is a flow chart outlining an illustrative technique for characterizing a card's 2D albedo map at the time of card production.

FIG. 11 is a flow chart outline one illustrative technique for estimating a card's 2D albedo map at a reader station.

DETAILED DESCRIPTION

For expository convenience, the following specification focuses on driver licenses. However, it should be understand that the principles herein can be used with tangible articles of any time (e.g., passports, paper currency, birth certificates, legal documents, medical records, computer storage media, etc.).

Figure 1:
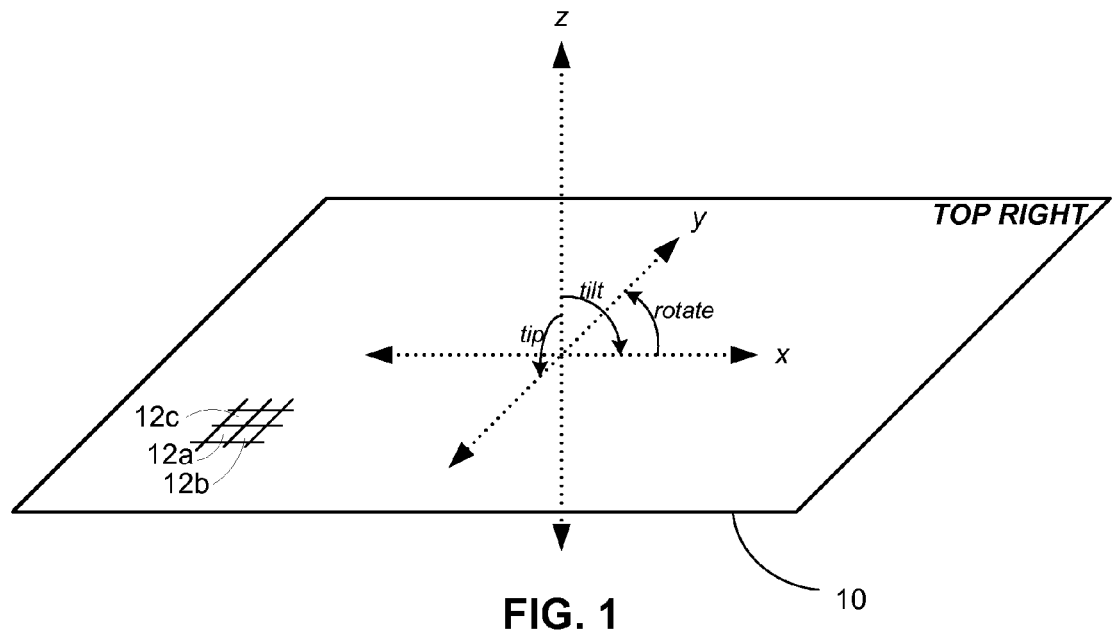
FIG. 1 shows an ID card, and an associated geometrical reference system (comprising x, y, z, tip angle, tilt angle, and rotation angle).

FIG. 1 shows the top face of a driver license 10, and one geometrical frame of reference with which certain of the features detailed below may be described.

Also shown in FIG. 1, in the lower left corner, are "a-pels" 12a, 12b, 12c ("albedo picture elements") that may be imagined as extending across the face of the card. These a-pels each correspond to an excerpt of the card face as sensed by an imaging system. (For clarity's sake, the a-pels are not to scale. They might more realistically be on the order of 0.1 or 1.0 millimeters on a side, or somewhere under 1,000 to over 100,000 a-pels per square inch of card surface.)

In a gross sense, generally flat surfaces typically exhibit a Lambertian reflectivity profile as a function of viewing angle toward that surface. That is, the maximum reflection of light from the surface occurs along the axis perpendicular to the surface (i.e., axis z in FIG. 1). However, if examined in more detail (e.g., on a per a-pel basis), it is found that the angle of maximum reflectivity typically diverges somewhat from this ideal. This divergence—shown as a "wobble" angle in FIG. 2, may be on the order of a few tenths of a degree in certain materials, but on the order of several degrees, or several tens of degrees, in other materials. (The porcupine is a rough analogy, with quills pointing in different directions.)

This direction at which light maximally reflects from an a-pel may be characterized by the wobble angle (i.e., the divergence from the z axis), and also by azimuth. Azimuth—measured within the plane of the card—may be regarded as the direction towards which the maximally-reflected light "leans."

Figure 2:
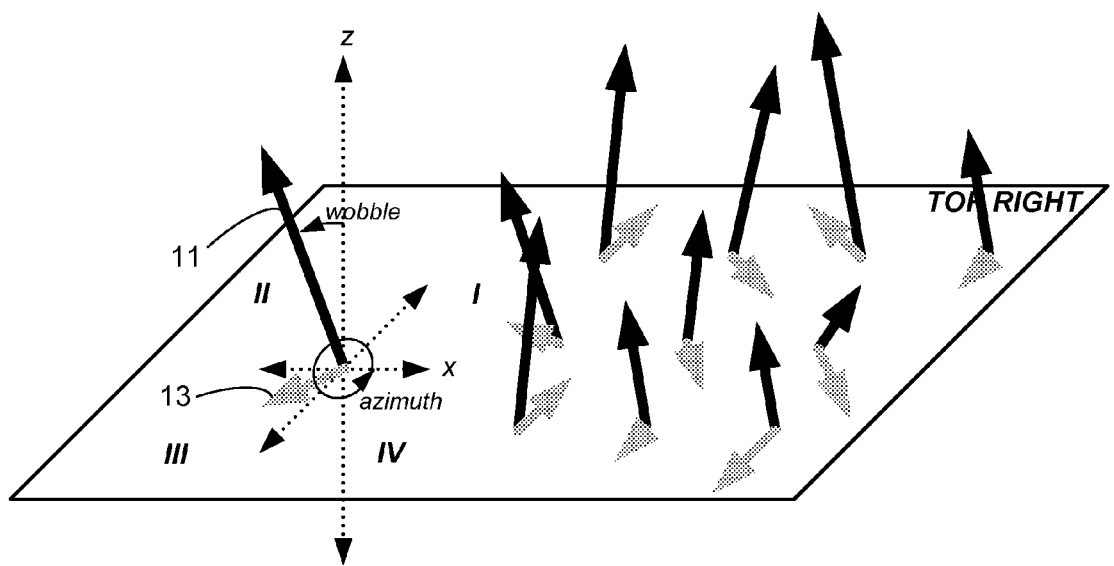
FIG. 2 shows the card of FIG. 1, with another geometrical reference system (x, y, z, wobble angle, and azimuth angle), and showing how a centroid of reflection for different a-pels on the surface of card is not always oriented along the z-axis, but rather typically wobbles, e.g., over a range of 0-20 degrees, and over a different azimuth angles.

In FIG. 2, the direction of maximum reflectivity for each a-pel is shown by a bold vector (arrow) 11. The grey arrow 13 beneath is a projection of the vector 11 onto the card's surface, and indicates the azimuth angle for each vector. As can be seen, the reflectivity vectors 11 associated with different a-pels in FIG. 2 have generally random wobble and azimuth angles.

Collectively, the reflectivity vectors 11 shown in FIG. 2 are essentially unique to any item. Like a fingerprint, they can be used to characterize the item, and distinguish it from all others (even "copies" that appear on close inspection—using classic flat-bed scanning or single-direction viewing—to be identical).

In addition to having wobble and azimuth angles, each of the vectors 11 in FIG. 2 is also characterized by length. The length of each vector indicates the magnitude of light reflected from a corresponding a-pel. The magnitude of reflected light can be a function of several factors. One prominent factor is the color of the surface: an a-pel that is substantially white reflects more light than a a-pel that is substantially black. When a flatbed scanner, or a camera, images an object, the pixel data that it captures, generally speaking, is an array of a-pel magnitude data.

A scanner or camera does not capture data from which, e.g., wobble or azimuth angles can be determined. Thus, in optically characterizing a card, a scanner captures only one dimension of data: magnitude data. Two further dimensions of independent data—wobble angle and azimuth angle—are ignored. By paying attention to these further dimensions of data, exponentially-improved abilities to identify an item—and distinguish it from others—are achieved. (A three-dimensional cylinder, viewed in only two dimensions, may appear as a rectangle, a circle, an ellipse, or a more complex shape—depending on the two-dimensional plane. Such ambiguities are easily resolved by increasing the dimension by one. Here the dimension can be increased by two.)

Figure 3:
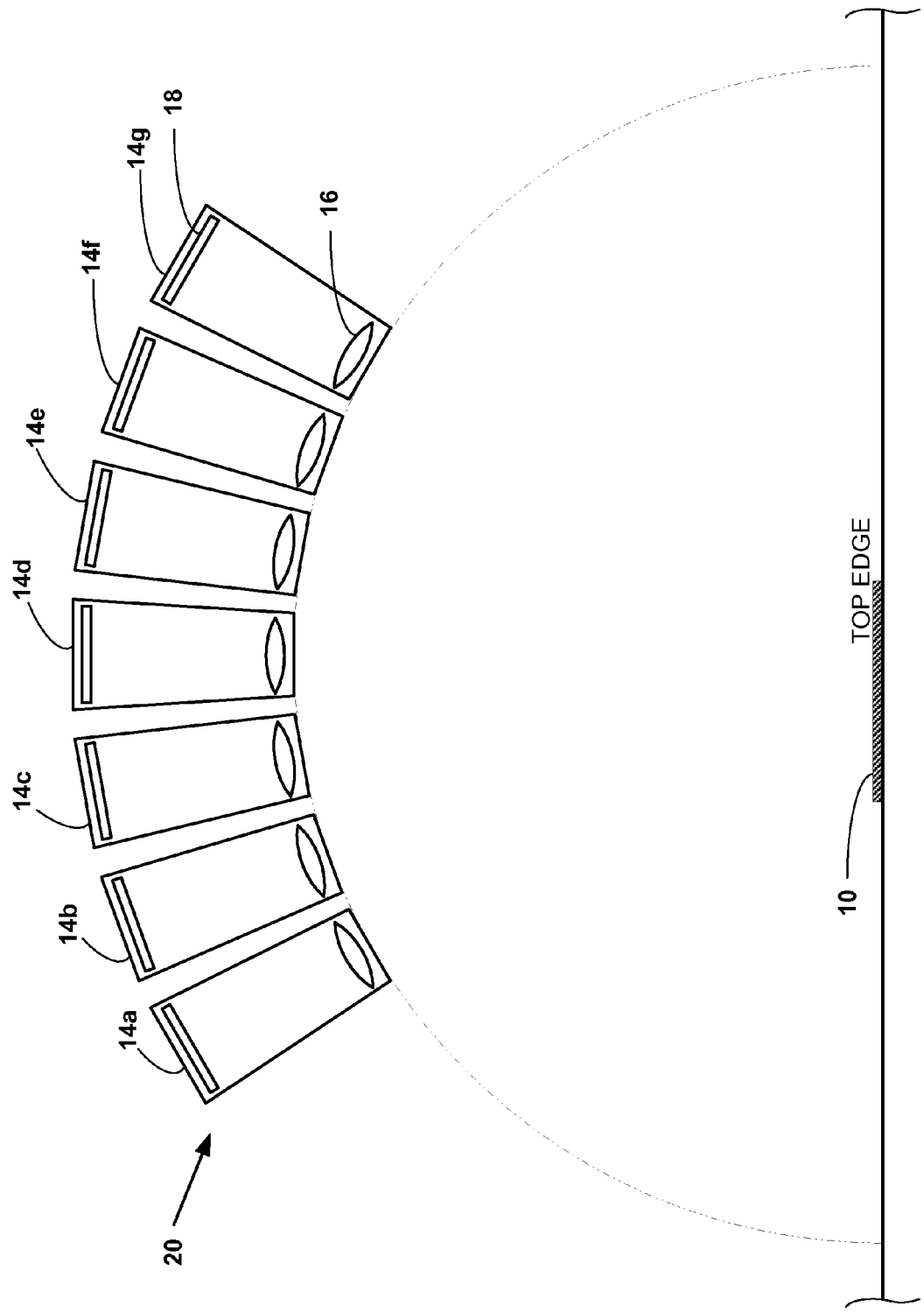
FIG. 3 is a schematic section view (passing through depicted y-axis in FIG. 1) showing part of an apparatus 20 for capturing card image data from different directions, at the time of card production.

A first task, then, is to capture the multi-dimensional data that characterizes the card. FIG. 3 shows part of an apparatus 20 for doing so.

Apparatus 20 comprises an array of cameras 14 disposed above a card 10. The card may be placed on a stage, or it may be held in position by a pick-and-place robot system.

Each camera 14 includes a lens 16, and a 2D image sensor 18. The image sensors may comprise, e.g., 1-5 megapixel CCD or CMOS sensors, as are customarily used in digital cameras.

The cameras are spaced at known locations relative to the card. In the sectional view of FIG. 3, seven cameras, 14*a*-14*g*, are shown—each positioned in the y-z plane of the card, at 10 degree spacings. Additional cameras (not shown) may be positioned in the x-z plane of the card, with similar angular spacings.

Desirably, images of the card are captured from a variety of perspectives. Basically, the idea here is to sample the reflectivity function of each a-pel on the card from a number of different directions, and use the sampled data points to determine (i.e., estimate) the approximate wobble and azimuth angle at which reflectivity is maximum. The resulting data may be regarded as the 2D (wobble/azimuth) albedo function across the card. (Note: the scientific literature tends to explicitly add the phrase "bi-reflectance" or "bi-directional" to the word "albedo"; most of this disclosure will implicitly include this directional aspect of the word "albedo".)

The FIG. 3 arrangement may comprise an array of 15 cameras, in an "X" configuration, each placed along a hemispherical surface over the card. Or the depicted arrangement may comprise 49 cameras, in a 7×7 array, warped to fit over the hemispherical surface. Lesser (or greater) numbers of cameras can alternatively be used (e.g., "X" patterns employing 5 or 10 cameras, or square arrays of 9 or 16 cameras). A minimal arrangement may comprise just three or four cameras, e.g., each viewing the card from an oblique angle of 15 degrees, and spaced every 120 or 90 degrees, respectively, around the object.

It is not necessary that the cameras all be equi-distant from the card. Nor is the spacing critical. In typical arrangements, lens-to-card distances on the order of 3"-30" inches may be used, although greater and lesser distances are also possible. (Especially when the card is imaged from short distances, compensation for parallax effects may be desirable. For example, the viewing angle for camera 14*g* may not be 30 degrees for all a-pels across the card. However, this effect is easily determined and can be taken into account when determining the wobble and azimuth angles.)

Nor is it required that the cameras be disposed in a regular array. Some advantages can accrue by stochastic sampling, i.e., by sampling from random directions.

In actual practice, cost and mechanical considerations may dictate that a lesser number of cameras be used. In one alternative, a single camera is used, in conjunction with an array of mirrors. Either the camera, or the mirror system, is moved as necessary to capture a sequence of different card images—each from a different direction.

Yet another arrangement is to position the card on a tip/tilt table, beneath a single camera. The card can be sequentially moved to a number of different positions relative to the camera, and an image is then acquired from each different card-camera presentation angle.

FIG. 3 does not show an illumination source, and the particular illumination source used is a secondary matter (i.e., of signal-to-noise ratios on obtaining wobble/azimuth signature data), but not of primary concern, where a variety of light sources should all suffice. Ordinary office lighting can potentially suffice—provided care is taken that the camera systems do not shadow the card and produce measurement-system artifacts. Or the apparatus 20 can include one or more controlled light sources. Generally, lighting from above the card surface is desired. Diffuse lighting can be used, but may tend to blur the directional reflectivity of a-pels on the card surface and tend to reduce the wobble amplitude of the resultant wobble peaks.

In some arrangements, polarized light, and/or polarizing filters at the sensors, can be used to further characterize the card's albedo function. Similarly, the albedo function may be sampled at different wavelengths of light. Both of these approaches can provide significant practical extensions of the basic principles of this disclosure, but they are not necessary for basic enablement.

Figure 4:
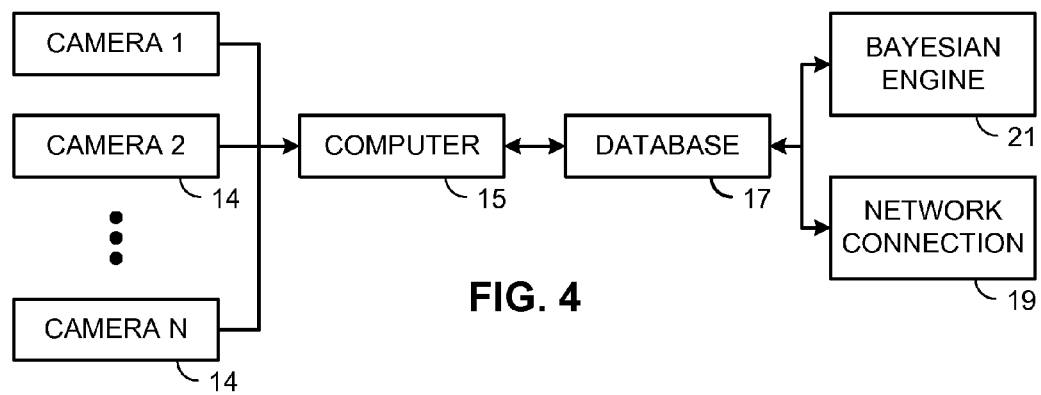
FIG. 4 is a block diagram of apparatus 20.
Figure 5:
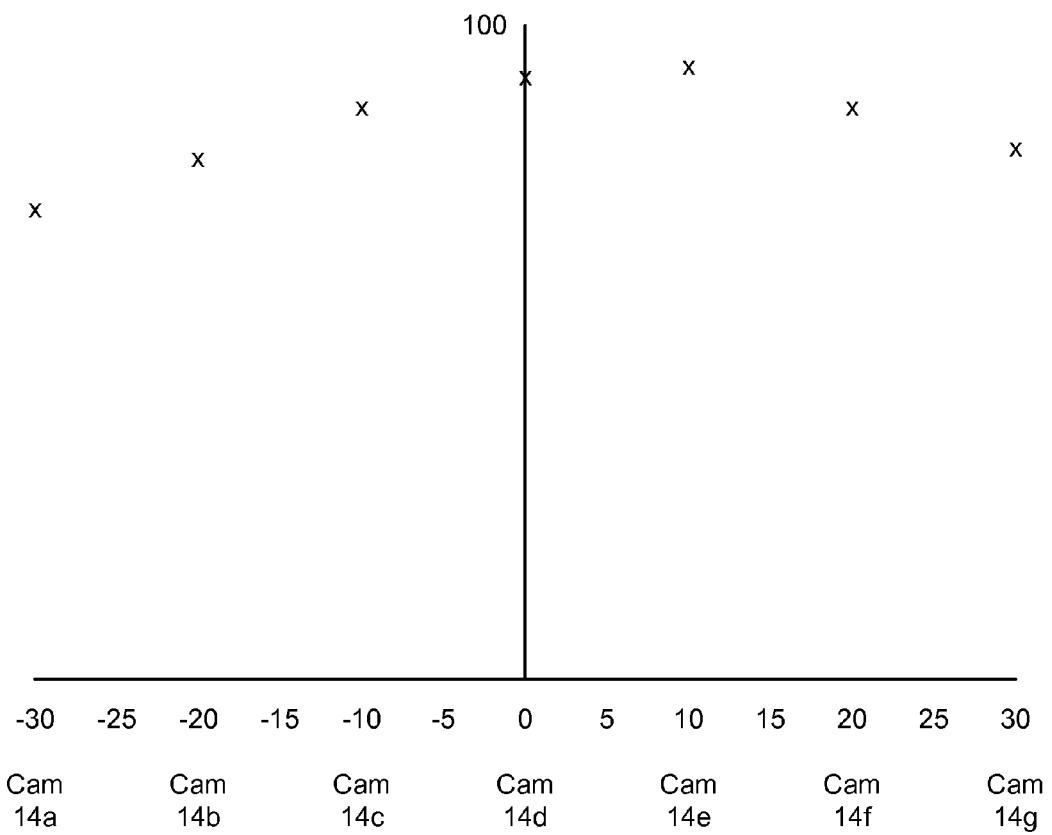
FIG. 5 is a plot showing the intensity from a sample a-pel as measured at different viewing angles.

FIG. 4 shows the magnitude of light reflected from a particular a-pel 12*a* on the card, as sensed by cameras 14*a*-14*g*, at respective angles of −30, −20, −10, 0, 10, 20, and 30 degrees along the y-z plane.

Light reflected from a given 'pel' may be imaged onto a 3×3 patch of pixels in directly-overhead camera 14*g*, but may be imaged onto only 2×3 patches of pixels in cameras 14*a* and 14*g*. Intervening cameras 14*b*, 14*c*, 14*e*, and 14*f* may have fractional rows/columns of photosensors illuminated by light reflected from the a-pel. With knowledge of the CCD layout (e.g., the dimensions of each component photosensor, and the border between photosensors), and the positioning of the cameras, such effects (e.g., fractional illumination) can be compensated—for (e.g., by weighting the contributions from different photosensors differently in aggregating the net illumination reflected from an a-pel. The aggregate illumination from an a-pel may thus range in value from zero to 2295 (the latter being a full 8 bit signal of 255, summed across 9 fully-illumined pixels).) For convenience of notation, this aggregate is represented in FIG. 4 on a scale of 0-100.

From inspection (i.e., by imagining a curve connecting the depicted sample points), it appears that the reflectivity function from sample a-pel 12*a* has a peak at about 6 degrees. However, the curve defined by FIG. 4 is just one slice through the reflectivity function's 3D shape (wobble/azimuth/magnitude). Other cameras—viewing the a-pel from positions off the axis of cameras 14*a*-14*g*, are needed to more fully characterize the a-pel's reflectivity function, or at the very least the general location of the albedo peak. Even with just the data from FIG. 4, however, we know that the reflectivity function "leans" towards the top edge of the card. (Unknown, from this data, is whether it leans also towards the left or right edges of the card.)

Given sample data from a set of non-collinear viewpoints, a centroid algorithm can be applied to mathematically determine a maxima of the a-pel's reflectivity function, in wobble angle, azimuth angle, and magnitude. This process can be performed by the computer 15 of FIG. 4. (Computer 15 can also serve other roles, such as being the "decisionmaker" that adjudicates whether cards sensed by reader 30 are genuine.) A statistical analysis of the wobble angles from different a-pels across a card is expected to show a generally Gaussian distribution (though significant departures from true Gaussian should cause no problem, in any event), centered about zero degrees, and with a standard deviation on the order of between 1 and 15 degrees, depending on material.

In FIG. 3, the cameras span a range of angles, +/−30 degrees, that is larger than the vast majority of wobble angles. Having at least one camera on each side of an a-pel's wobble angle helps refine the accuracy by which the wobble angle can be determined (e.g., by the centroid algorithm). However, this is not a requirement. For example, samples taken from cameras at 0, 6 and 12 degrees can nonetheless allow estimation of a wobble angle of, e.g., 15 or 20 degrees.

When a driver license is manufactured, e.g., by equipment at a state Department of Motor Vehicles (DMV) office, or at a central manufacturing facility, the license desirably is characterized by an apparatus 20 like that shown in FIGS. 3 and 4 prior to being issued to the owner (which may be by mailing, in the case of a central manufacturing facility). In some processes, such apparatus can be included at the end of the manufacturing process. The resulting data is stored in the database 17 of FIG. 4.

In one arrangement, the albedo data is stored as a series of records, each indexed by the a-pel's respective row and column number. If each a-pel is 0.5 millimeter on a side, the albedo function for a driver license may comprise 100 rows by 175 columns of data, or 17,500 a-pels total. Each record may store the wobble angle for that a-pel, together with the associated azimuth angle, and also the magnitude.

More or less data can, of course, be stored. For example, in some arrangements the magnitude data may not be stored. In another, either the wobble angle or the azimuth angle may not be stored.

Figure 6:
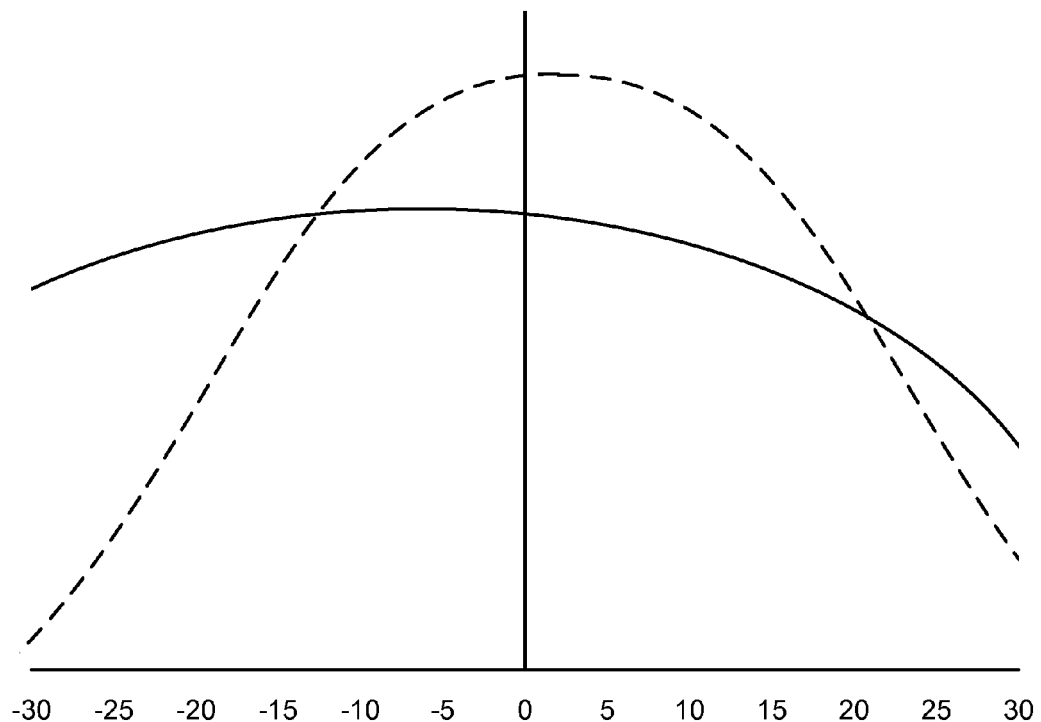
FIG. 6 shows different reflectivity functions.

In still other arrangements, more data is stored. The albedo function for each a-pel may be described not just by the 3D coordinates of the endpoints of the vectors 11 shown in FIG. 2, but also by the 3D volume of the reflectivity function. That is, the light reflected from an a-pel may be narrowly concentrated along a vector 11 (like a spotlight function), or it may form a broad volume, with lots of spread about the vector (like a floodlight function). A slice of a spotlight-like reflectivity function volume is shown by the dashed curve of FIG. 6; a slice from a more floodlight-like reflectivity function volume is shown by the solid line.

In one arrangement, the raw data from all of the cameras is stored in the database—characterizing the 3D volume reflectivity function at different sample angles. In another arrangement, a curve fitting algorithm is applied to estimate a 3D model of the reflectivity volume from the sample points, and the parameters of this model can then be stored. Furthermore, a low-order polynomial fit to the volume can be removed from the data, leaving only the higher order "unique structure" as a very subtle form of characterizing the volumes. Such possibilities tend to go beyond what mass-produced cards such as driver's licenses may contemplate as a practical matter, and point more toward higher sensitivity applications such as airport security and the like.

The database 17 in which the albedo data is stored can comprise the DMV's existing licensee database, e.g., including name, age, driving restrictions, photo portrait, etc. Or it can comprise a separate database.

Driver licenses are typically encoded with machine-readable information, such as digital watermarks, bar codes and RFID data. The information conveyed by the machine-readable data may also be stored in the database with the albedo measurements, together with other information, such as a card ID.

The exemplary card characterization process detailed above is set forth in the flow chart of FIG. 7.

After characterization, the license is issued to the user. It then goes into the user's wallet or purse and begins a life of abuse—being scraped, worn, washed, etc. Eventually, it is pulled from the wallet and presented as an ID credential, at a reading station. (The reading station may be at an airport security checkpoint, at a liquor store, in a police cruiser, at a building access, etc.)

Desirably, each reader station is relatively inexpensive, and does not require much training to operate. One version of a reader station 30 (FIG. 8) is a conventional personal computer 34, equipped with a single camera 32 and a network connection 36.

The camera 32 need not be a carefully characterized measuring instrument; a simple webcam will suffice. One popular web cam is the Creative "Live Cam Voice" model, which retails for less than $100, and has a 1.3 megapixel sensor. Others include the Creative "WebCam Live! Ultra" model (which includes a 1024×768 sensor), and the Logitech "Quickcam Pro 4000" (which includes a 1280×960 pixel sensor). These webcams all can capture 30 frames of video per second, at a resolution of 640×480 pixels or higher.

Figure 8:
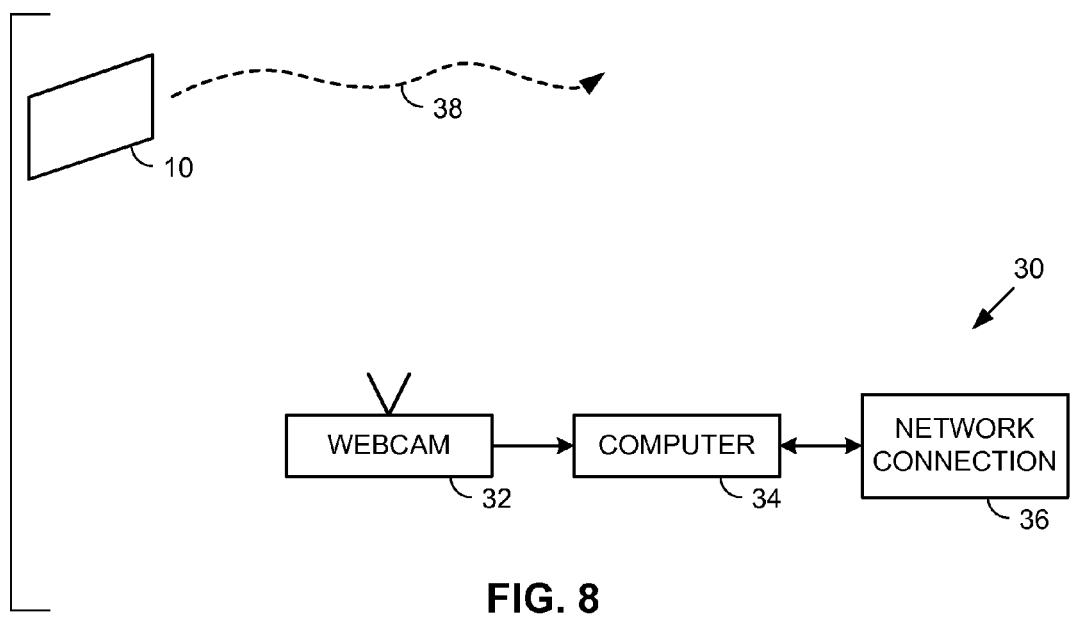
FIG. 8 is a block diagram of a reader station 30, with a card being waved in front of a webcam.

To present a card 10 for reading, the user simply waves the card in front of the webcam (as shown by the wavy dashed line in FIG. 8, which may be termed a "swoop"). The webcam captures multiple frames of image data depicting the card, e.g., one every 0.033 seconds.

As the card moves across the webcam sensor's field of view, it presents different perspectives, i.e., the webcam captures frames of image data from different angles. Whereas in the card characterization apparatus 20 of FIG. 3, plural cameras capture several perspectives of image data from a stationary card, in the reader arrangement 30 of FIG. 8, a single camera captures several perspectives of image data from a moving card.

The data acquired by reader station 30 does not compare—in quality—to that captured by characterization apparatus 20. However, it is nonetheless more than sufficient—in conjunction with the earlier acquired information stored in database 17—to discriminate the card from even "perfect" counterfeits.

Figure 9A:
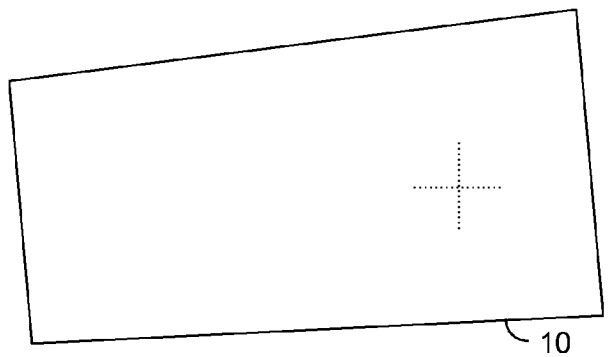
FIGS. 9A-C, and 10A-C, show successive frames of how a card might be viewed by an optical sensor at a reader station, when the card is waved before the sensor by a user.
Figure 9B:
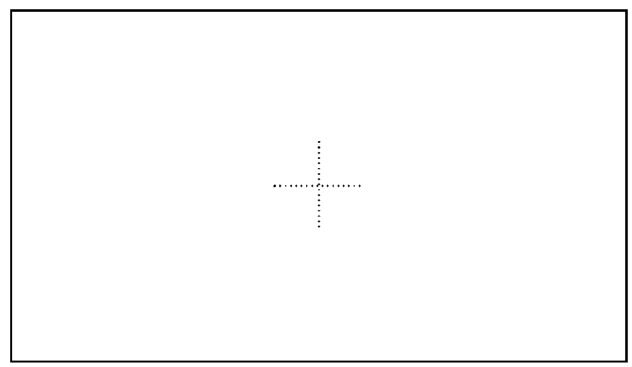
Figure 9C:
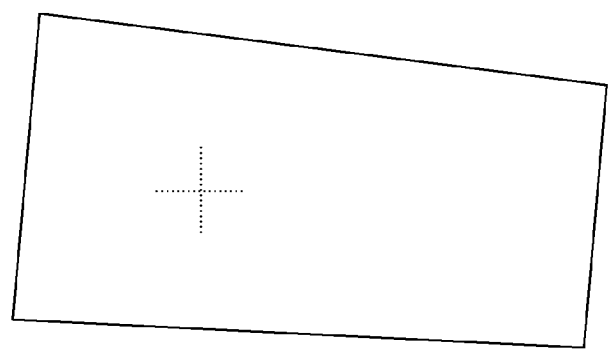

FIGS. 9A, 9B and 9C show a sample sequence of images that may be captured by reader station webcam 32. (The center of the webcam's field of view is shown by the dotted +.) In FIG. 9A, the left edge of the card is further away from the webcam, so appears fore-shortened. The card is likewise rotated a bit to the left. In FIG. 9B, the card is squarely presented before the webcam. In FIG. 9C, the right edge of the card is further away from the webcam, and the card is rotated a bit to the right.

In FIG. 9B, a frame is captured with the card directly facing the camera (i.e., the card is oriented with its z-axis passing through the lens of the webcam). This is not necessary. As long as the front of the card comes within about 10 to 20 degrees of facing the camera—at some point during its travel—the card's 2D albedo function may be satisfactorily estimated.

(It is not necessary that card be entirely within field of view in each frame; useful data can be obtained even if only if part of the card is visible.)

Figure 10A:
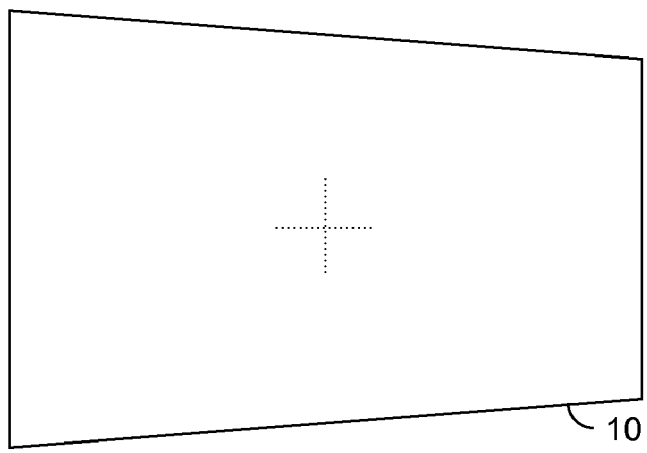
Figure 10B:
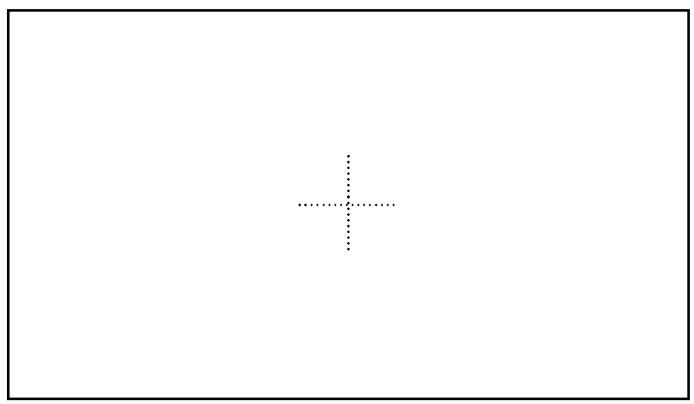
Figure 10C:
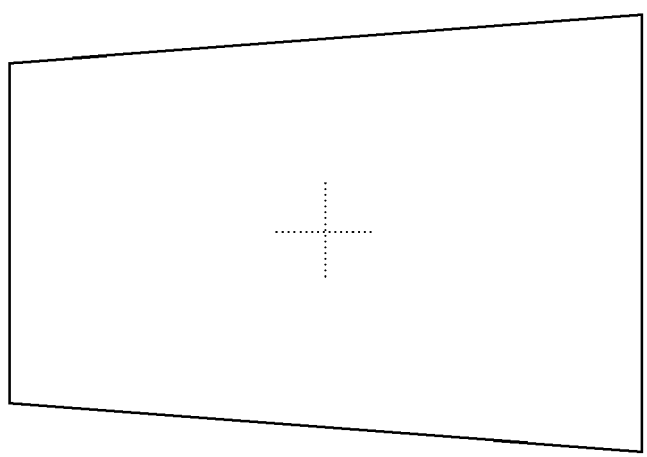

FIGS. 10A, 10B, and 10C show another sample sequence. Here the card is not laterally moved past the camera. Instead, it is simply tilted to different orientations.

Because the card in FIG. 10 is moved about just a single axis (i.e., the "tilt" axis in FIG. 1), the image samples acquired by webcam 32 likewise fall along a common axis. Although the card's albedo function can be estimated with such data, a better estimate is obtained if the card is moved around both the tip and tilt axis, as it is being waved in front of the webcam.

When the card 10 was originally characterized by apparatus 20, the measurements were taken in a precisely defined geometrical reference frame, e.g., in which the card was located at a known position relative to the cameras. The 'wave' of the card in front of webcam 32 does not enjoy this advantage. Nonetheless, the geometry of the 'wave' can still be precisely assessed. (Note: To be a bit more precise, the card will be presented to the camera across a series of frames, with each frame occupying a generally unique angular direction of the camera relative to the perpendicular of the card, thus producing a form of "track" through angular space, where from a consumer's or user's perspective waving the card in front of the camera, the term "wave" is a bit more intuitive).

A watermark carried by the card can play a key role here. The preferred watermark includes a steganographic calibration (e.g., reference or subliminal grid) signal by which affine distortion of the imaged card can be accurately quantified. (Examples are given, e.g., in U.S. Pat. Nos. 6,614,914 and 6,580,809; in publications US20040105569 and US20040101157; U.S. Pat. No. 6,959,098 teaches how distortion can be characterized by such watermark calibration signals in conjunction with visible image features.) From this affine distortion information, the 6D location of the card (x, y, z, tip, tilt, rotation) relative to the webcam can be determined.

In processing the frames of image data captured by webcam 32, computer 34 thus starts by examining each frame for watermark information, and characterizing the position of the card depicted in such frame by reference to such information. With this position information, the angle from which the sensor views each a-pel in each frame can be determined. (Again, parallax correction may be appropriate.)

Once each frame of card data is associated with its respective viewing angles, the reflectivity of different a-pels can be assessed at different angles—using a procedure like that detailed in conjunction with apparatus 20. That is, the intensities of reflected light sensed from a given a-pel—viewed from different perspectives—can be applied to a centroid algorithm to estimate the wobble and azimuth angles at which such a-pel reflectivity is maximized. Given that the geometry of measurement is significantly less controlled than during the production process, the precise algorithms for estimating wobble peaks and angles is inherently much noisier but nevertheless still quite valid.

The resulting "random track sample" of the 2D albedo map for the card can be sent over the network, and compared against the albedo maps stored in database 17. Despite the many degradations to which the card may have been physically subjected since its manufacture and characterization, the set of albedo data acquired by reader station 30 will correlate, and will correlate strongly, with only one set of albedo data in the database. The card to which it corresponds establishes its true identity. This approach represents the complete data version of authentication, essentially boiling down to sending the database all captured frames of data (or at least heavily compressed frames). Practical situations (and generally not-for-free bandwidth considerations on communication channels) point toward finding data economies at the camera head which can on the one hand greatly reduce the data volume required to be sent to the database, while at the same time maintaining the essential albedo content required for formalized distinguishability testing processes.

(The assessment of geometric orientation, and estimation of the 2D albedo map, can be performed by computer 34, but need not be. In other arrangements, the raw image data collected by reader 30—or a derivative thereof—can be transmitted to remote computer 15 for such processing.)

Given the simplicity of the reader station 30, it is unlikely that the 2D albedo data it collects will be as accurately, and as finely, resolved as that produced by apparatus 20. However, such levels of accuracy and resolution are not required.

For example, instead of characterizing the reflectivity of each a-pel's wobble and azimuth angles to two or three significant figures (e.g., 0-90 degrees and 0-360 degrees), as might be achieved by apparatus 20, a relatively coarser estimate may be made. For example, referring to vector 11 in FIG. 2, the reading station computer 34 (or computer 15) may simply quantify the vector as leaning into one of four quadrants: I, II, III or IV (northeast, northwest, southwest, or southeast). In this arrangement, each a-pel is associated with just a two-bit datum. This abbreviated data set can likewise be sent to database 17 for comparison against the earlier-acquired measurements, e.g., by a Bayesian engine 21. Again, only one previously-characterized card will highly correlate with such data. (Sufficient correlation can be determined by reference to a threshold. Depending on the application, the absolute correlation coefficient threshold may be set fairly low, e.g. between 0.01 and 0.1 In other applications, a threshold of between 0.1 and 0.5 may be used. In still others, a correlation of more than 0.5 may be required.)

There is nothing magic about quadrants. The reflectivity may be represented as a single bit (e.g., leans north or south; or leans east or west). Or it may be represented with higher precision (e.g., falling into one of eight 45 degree swaths). Etc.

(Typically, the 2D albedo map acquired by apparatus 20, and stored in database 17, will be two- to ten-times higher in resolution than the albedo map data collected at the reader station 30. To perform the correlation, the finer a-pel data in database 17 can be combined—across several small a-pels—to yield a vector sum corresponding to a larger a-pel, of the sort estimated by reader 30.)

In some embodiments, albedo discrepancies due to the over-sampling of the data at the time the card is initially characterized (e.g., during so-called "enrollment" of the card's characteristics in the DMV database, such as at the time of driver's license issuance) and the relative sparse sampling when the card is later sensed by a retail terminal, are mitigated by using less than all of the former data. For example, while 49 different views of the card may have been captured during enrollment (e.g., from 49 cameras, or by positioning a tip/tilt stage to 49 different positions), a reference albedo may be calculated by providing to a centroid algorithm only data from a subset of these views, e.g., those most closely matching the views captured during the swoop of the card at the retail presentment. The results of this calculation can then be correlated with results from a centroid operation performed on data captured during the swoop. If correlation is found (exceeding some nominal threshold, such as 2-10%), then the license is deemed to be the original.

Put another way, such a method includes capturing plural views of an original license (or other object)—each from a different perspective, and storing corresponding data (e.g., at enrollment). Later, plural views are captured from a suspect license—again, each from a different perspective. A subset of the originally stored data—corresponding to the perspectives from which the views of the suspect license were captured—is then identified (e.g., frames captured at enrollment from vantage points most similar to those at which swoop image frames were captured). By reference to this subset, and the subsequently-captured views, a determination is made as to whether the suspect license is the original license. (Centroid algorithms can be applied to the subset data, and to the later-captured views of the suspect license, to determine two albedo functions. A correlation operation, such as a dot product operation, can then be performed on these two functions to determine correspondence.)

Another approach is to calculate two albedo functions from the reference data captured at enrollment: the first applying all of the reference data to a centroid algorithm, and the second using just those frames closest to the frames captured during the swoop at retail presentment when computing albedo centroids. The two resulting albedo functions are compared, e.g., on an a-pel by a-pel basis. Where the two functions yield a significantly different directional albedo for a particular a-pel (e.g., exceeding a preset threshold, such as falling in a different quadrant, or diverging by more than 45 degrees), then that a-pel can be disregarded when correlating against the data captured during the swoop at retail presentment. (Still another approach is to use only those a-pels that are most significantly changed when computed from a subset of the original data, versus from the unabridged set; i.e., disregarding a-pels that match within a threshold.)

The reader station may provide audio or visual feedback to the user, to confirm that the user's wave of the card was satisfactory. If the card didn't move enough, e.g., if it didn't provide image viewpoints differing by at least a threshold amount (e.g., 5 degrees, 10 degrees, or 20 degrees), feedback might not be provided. If the card was moved so quickly that too few frames were captured (or the frames were too blurry), feedback might not be provided. Likewise if the card movement was outside the sensor's field of view too much. If no fault is noted with the image capture, feedback indicating a proper wave can be provided.

The data returned by the Bayesian engine 21 can take different forms. It could simply give a "green light" indication to the reader station, indicating that the card matched one in database 17. (Since the 2D albedo profile is so unique, details of the match may not be necessary; there is essentially only one possibility—the card is the one it purports (e.g., by its text or watermark or barcode) to be.) In other arrangements, the remote computer 15 can return to the reader station 30 information about the card, or its bearer, obtained from database 17 (or other database).

In a particular arrangement, the watermark conveyed by the card is used not just for geometrical orientation purposes, but is also decoded by reader station 30 to provide an initial assessment of the card's ID. That is, it may convey the name of the user, or their driver license number. This decoded information may be sent to the database 17 with the albedo data. In this case, the database's task is simplified. It identifies the card in its storage issued to that user, or with that driver license number. Then a simple comparison is performed between the reference albedo map stored for that card, with the albedo map estimate provided by reader 30. If they correlate, the card is valid. (Other machine readable data may be used for similar purpose, e.g., bar code, RFID, etc.)

(The watermark may be read from an aggregate image, produced by combining several of the sampled images, after correcting each for affine distortion. Technology for combining low resolution images by reference to encoded digital watermark signals, so as to yield a higher quality image, is taught, e.g., in published U.S. patent application 20030002707.)

The 'wave' of the card in front of the webcam may result in the capture of 10-30 images, depending on the speed of movement. Generally speaking, the more images, the better. In some arrangements, however, it may be desirable to limit the number of images processed, e.g., to a maximum of 12. In deciding what images to keep, a variety of criteria may be employed.

For example, if two images present essentially the same perspective of the card, then one may be discarded, or at least optimally averaged into the other taking account of slight affine transformation changes. Similarly, if any image suffers a technical defect—such as glare or undue blur, it may be discarded too. (Image sharpness may be estimated by transforming part or all of a captured frame of image data into the frequency domain, and determining the amount of high frequency energy). Images that present the card at a too-oblique angle (e.g., more than 30 or 45 degrees) may also be discarded.

In an alternative reading arrangement, the card is laid (or held) stationary, and a camera is waved over it. The camera in such arrangement may be a cell phone. In this arrangement (as in others), the raw captured image data can be transmitted to a separate (e.g., remote) computer device for processing, or it can be processed by the same device used in the capturing of the data.

Figure 12A:
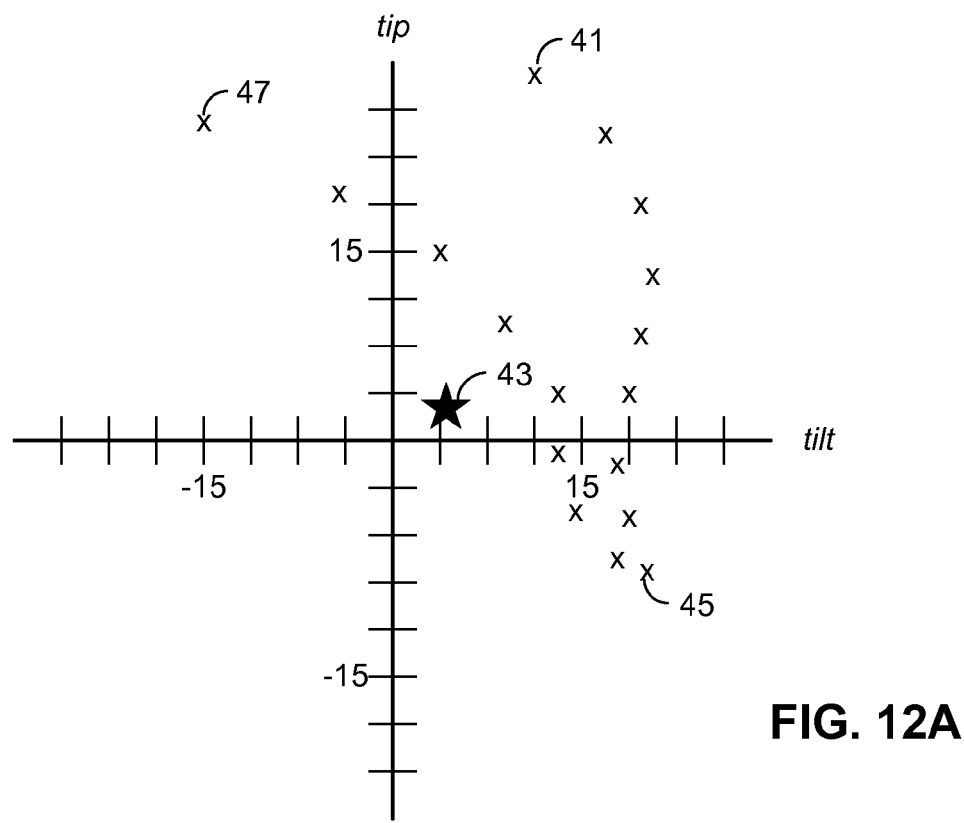
FIGS. 12A and 12B show plots detailing a "wave" of a card in front of a web cam sensor.

FIG. 12A details one "swoop" pass of a sensor over a card (or a card in front of a sensor). Each 'x' represents the orientation of the card relative to the sensor at a sample instant. The illustrated plot is shown in the tip/tilt frame of reference (with 0/0 indicating that the card's z-axis is passing through the sensor lens).

At the first sample instant 41, the card is oriented with a tilt of about 12 degrees, and a tip of about 29 degrees, relative to the sensor. Subsequent samples are taken at different orientations. At each orientation, the brightness of the a-pels are sensed.

The star figure 43 in FIG. 12A shows the tip/tilt at which the reflectivity from a particular a-pel 12a is maximized. At all other points on the graph, the brightness reflected from this a-pel is less than the brightness that would be sensed at position 43. By sampling the intensity of the 2D albedo profile at all the 'x' points, however, the centroid algorithm allows estimation of the location of maxima 43.

It may be noted that the sample points in FIG. 12A define a two-part 'swoop'—the first going from sample 41 to 45, and the second going from sample 45 back up to 47. The samples near 45 are relatively closely spaced, indicating that the sensor (or card) movement is slowing. The fact that the swoop generally reverses direction indicates that the sensor (or card) movement similarly generally reverses its movement for the second part of the swoop.

(A two-part, generally-reversing, swoop isn't necessary; a one-way, unitary swoop can also be used. However, the former is preferred. A unitary swoop generally characterizes the shape of the 2D albedo profile along just one of its dimensions. The second part of a generally-reversing swoop (provided it isn't identical to the first part) provides samples spaced in another dimension of the albedo profile—allowing the profile to be characterized more accurately.)

Figure 12B:
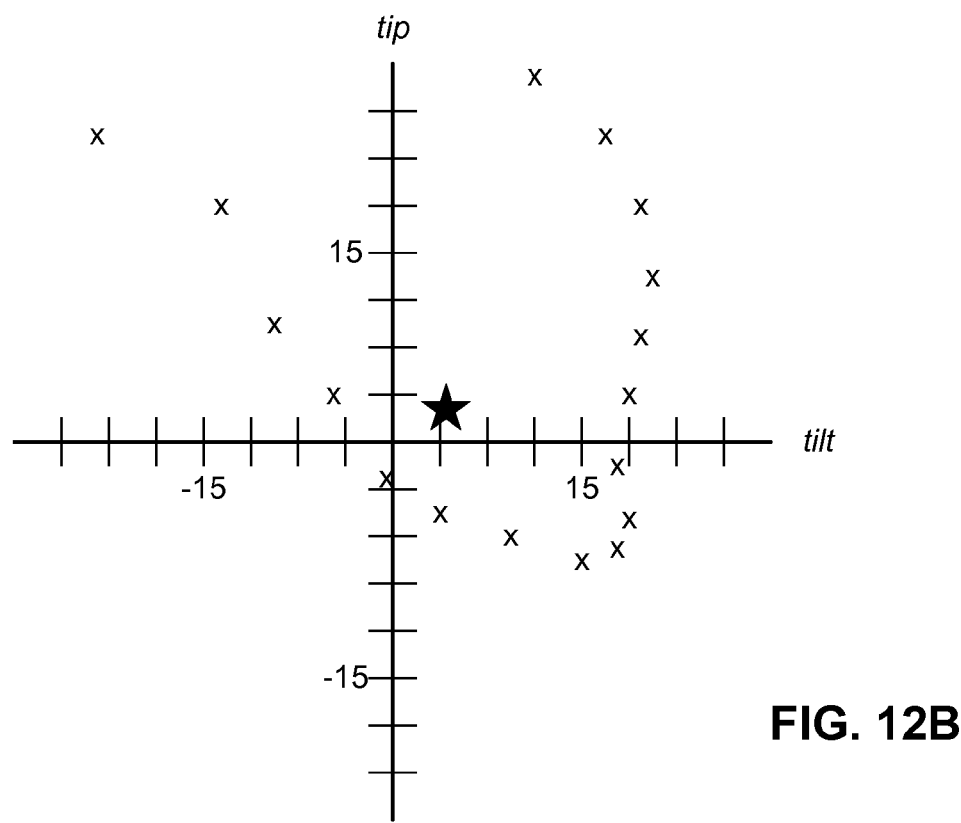

Note that all of the samples in FIG. 12A are on the same side of maxima 43. This will be the typical case. (Also typical is that the movement will usually not provide a sample directly at the maxima point 43 for a-pel 12a.) Preferable—although not necessary—is for the second part of the 'swoop' movement to take samples on the opposite side of the maxima. Such a sampling arrangement in shown in FIG. 12B. By sampling the 2D albedo profile on two sides of its maxima, the shape of the profile—and thus the location of the maxima—can more accurately be determined.

Although the calibration signals steganographically encoded with the preferred digital watermark are highly useful in determining the geometry of card-presentation-to-webcam, this geometry can be estimated by other arrangements. For example, visible features can be identified on the imaged card (e.g., by pattern matching algorithms), and the distortion of such features from their known shapes/dimensions can be used to infer card position. Likewise, if the outer rectangular dimensions of the card are known (e.g., 2" and 3.5"), edge-finding algorithms can be employed to identify the card edges, and these features can again be used to estimate card orientation relative to the webcam. (Such arrangements are shown, e.g., in U.S. Pat. No. 6,959,098.)

Likewise, although the foregoing description did not make use of watermark data by apparatus 20 to precisely characterize position of the card, such information is generally helpful and desirably would be used.

Different a-pels—even adjoining a-pels—on the card may have entirely different reflectance curves. Such differences can be induced by the manufacturing arrangement. In an extreme case, the card can be hit with a meat tenderizing mallet—imparting a marked surface texture to the card. Other arrangements for making the reflectivity curves relatively more chaotic can of course be used.

Reflectance characteristics can also be tailored by choice of materials. Some materials will generally exhibit relatively diffuse reflectance characteristics (e.g., floodlight-like 2D albedo profiles). While such materials can be used, it is preferable to identify materials that tend to have less-diffuse reflectance attributes, so that the maxima from each a-pel can more readily be defined.

In alternative arrangements, each of the oblique card images captured by apparatus 20 and reading station 30 can be normalized to their original rectilinear shape and their original scale, prior to estimation of the 2D albedo map. Again, this can be done by reference to the watermark calibration information embedded in the card.

A refinement may be made to the watermark-based image registration processes described in the cited patent documents, above. Normally, these processes produce an estimate of parameters that characterize the affine distortion of an image. The image is then processed to counter-act such estimated distortion, and the watermark payload is then read.

This may be refined as follows: instead of using just the original estimate of the distorting parameters, try perturbing these estimates slightly. For each perturbed set of estimates, counter-distort the image accordingly, and sense the strength of the watermark payload signal. It may be found that counter-distorting with one of these slightly-perturbed distortion estimates yields a stronger watermark payload signal than occurs using the original distortion estimate. In such case, the perturbed estimate more accurately characterizes the distortion.

By use of such refinement, still more precise determination of card position/orientation may be achieved (e.g., angular resolution on the order of a sixtieth of a degree may be obtained).

The Bayesian engine 21, at one level, simply checks the albedo data provided from reader station 30 with albedo data corresponding to one or more cards earlier characterized by apparatus 20 and stored in database 17. One check, as noted, is correlation. This can comprise, e.g., computing a dot product between two albedo maps represented in a zero-mean version. (E.g., each set of albedo data can represent leaning of the maximum reflectance vector in the east/west dimension (tilt) as −1 for west, and 1 for east. Likewise −1 for north and 1 for south. If there is no correlation between the albedos, the sum of such products will tend towards zero. If there is correlation, the prevalence of same-sign products will cause the sum to increase. This correlation will be apparent even if 95%-98% of the a-pel reflectivity characteristics are changed, e.g., by wear, during the card's service life. Those changes will generally be random; correlation of the remaining 2%-5% will establish the genuineness of the card.)

The albedo data sensed for a particular a-pel might also be processed in connection with a "confidence" factor, e.g., ranging from 1 to 5 (maximum confidence). In the example given above, in which the sensed albedo "lean" from each pel is quantized as being in one of four quadrants (I-IV), the confidence factor can be less if the lean is slight, and more if the lean is great. (More sophisticated confidence metrics can of course be employed.)

Table 1 shows the respective quadrant into which each of plural a-pels "leans":

TABLE 1

| I   | III | III | II  | IV  |
| --- | --- | --- | --- | --- |
| IV  | I   | I   | II  | III |
| I   | III | II  | IV  | IV  |
| I   | II  | IV  | I   | II  |
| III | I   | IV  | I   | I   |

Table 2 shows the corresponding "confidence factors" for each a-pel:

TABLE 2

| 2 | 3 | 2 | 4 | 5 |
| - | - | - | - | - |
| 2 | 3 | 3 | 1 | 2 |
| 4 | 5 | 1 | 2 | 3 |
| 4 | 2 | 4 | 3 | 3 |
| 5 | 2 | 3 | 4 | 1 |

These confidence factors can be used to bias the weight given each of the respective a-pel data, in identifying a reference card with the closest match. Perhaps the simplest biasing function is simply to discard all of the a-pel data that does not have a confidence of 'V.' Such a filtered set of a-pel data is shown in Table 3:

TABLE 3

|     |     |     |     |     |
| --- | --- | --- | --- | --- |
|     |     |     |     | IV  |
|     |     |     | III |     |
|     | III |     |     |     |

Thresholds other than 'V' can, of course, be used.

In slightly more sophisticated arrangements, a-pel data for all pels having confidence of II or more are used, and the matching algorithm weights the degree of a match in correspondence with the confidence factors of the a-pels used in the analysis.

The Bayesian engine can consider further factors. For example, it may, over time, learn that certain individuals present their card along a "swoop" path that seems to have certain consistencies. Detection of a path following this expected pattern can tend to affirm that the card is being used by its authorized owner. Marked difference from such an expected swoop pattern may prompt the reader to have the user repeat the card presentation, or otherwise focus further inquiry on the user. Likewise, the Bayesian engine can consider the IP address of the device sending the data, and factor any inferences therefrom into the analysis.

In some arrangements, the operation at the database involves retrieving the albedo data previously stored for a particular card, and comparing it with data sensed from a reader device—to ensure they correspond in an expected manner. If so, the card is confirmed to be the same physical card from which the albedo data was originally measured. This sequence of operation is used, e.g., when a tentative identification of the card can be made, e.g., by reference to a name or license number printed on the card, or encoded thereon in machine-readable form. This tentative identification is then used to identify one particular set of albedo data in the database for comparison.

A more complicated situation arises when no tentative identification of the card is made before consulting the database. In this case, the task is to identify a "best match" between the albedo data derived from data sensed at the reader device, and sets of albedo data earlier stored in the database.

Art known from other disciplines can be applied in this undertaking, such as "robust hashing" art known in audio/video fingerprinting and elsewhere, and associated database search optimization techniques. For example, it is not necessary to check the new set of sensed albedo data against all of the old albedo; certain old data can be almost immediately excluded from consideration (e.g., by techniques such as database pruning). The albedo data can be distilled into a smaller representation, which is robust against many corruption mechanisms. Such techniques, and other useful technologies, are detailed in WO02/065782, US20060075237, US20050259819, and US20050141707.

Particular approaches for making key data derived from physically random media more robust are detailed in Skoric, Robust Key Extraction from Physical Uncloneable Functions," Springer Verlag, LNCS 3531, pp. 407-422, 2005 (attached hereto as Exhibit A). Techniques employing Skoric's teachings can likewise be employed in connection with the presently-described technology.

Different albedo maps can also be characterized for different spectrums and/or polarizations of illumination.

The assignee has run tests, using a robot-controlled test jig, at two discrete angles of tilt in the y direction, covering −10 to 10 degrees at one degree increments in the x-direction. Plural seemingly-identical demonstration driver licenses of two different designs have been employed. One license design is particularly interesting because it is laminated with the 3M Confirm laminate, which is comprised of little beads, which serve as wobble randomizers.

The per pixel luminance measurements show consistency between images captured at a given tilt angle and position on the robot mount. Also, the luminance measurements vary with tilt angle and position on the card (pixel number). When a new set of captures are taken of a different but visually identical card, the per pixel luminance measurements at a specific tilt angle differ from those of the first card.

In the arrangements detailed above, the albedo function is generally static. However, it is possible for the object's albedo function to be changed (either at the time of initial manufacture, or subsequently).

The simplest arrangements allow for the albedo data to be changed once. Various chemical formations (e.g., photographic emulsions, photoreactive inks, etc.) change state in response to particular stimuli (illumination, chemical, thermal, etc.) If a card is provided with such materials (e.g., on the surface, or embedded within), stimulating same can induce a change that affects the albedo function.

One particular arrangement employs a card having photoreactive ink, illuminated with a laser via a micromirror array (perhaps up to 10-50 million mirrors). By controlling the micromirror orientations, regions of the card are illuminated, or not, by the laser light. Corresponding changes are thus induced. (The micromirrors can be controlled so that laser light exposes some regions for different time periods than others—further tailoring the change to the albedo function.)

Another arrangement employs a chemical composition that reacts to laser illumination at a particular wavelength by producing a broad albedo peak in the direction from which the illumination is applied. Desirably, illumination at a different wavelength removes this effect, e.g., restoring the surface to a quasi-"virgin" state, or causing a random albedo response, or a peak in a different direction.

Yet another arrangement employs a material that changes its optical index of refraction following exposure to a given chemical compound, such as water or a solvent. Such a material—spanning the card surface—may be spritzed with liquid (e.g., with a mist or aerosol spray) to change its optical properties. Some such materials are described, e.g., in Kim, Singh and Lyon, "Label-Free Biosensing with Hydrogel Microlenses," Angewandte Chemie International Edition, Volume 45, Issue 9, Pages 1446-1449, 2006.

In each of these arrangements, although only a single state change is usually possible, several successive generations of data can be induced by applying the changing mechanism sparingly—changing only a subset of the a-pels (often a random subset) each time. For example, the liquid spritzing in the foregoing example may be light enough to alter just 10% of the a-pels. Even if performed 10 times, further changes may be subsequently achieved since—statistically—an action that leaves 90% of the a-pels unchanged, if repeated 10 times, still leaves about 35% of the pels unchanged. The other change-mechanisms can likewise be applied to a subset of card features.

Such techniques can be incorporated in the work flow of a card issuance system, processing cards either before or after variable data (e.g., name, photo) are applied.

Other arrangements allow the albedo function to be changed virtually without limit. Consider, for example, a card that has a textured laminate, comprising micro-droplets of clear thermoplastic that is essentially rigid at temperatures up to about 150F-250F, but that becomes pliable above such temperatures. Such droplets may originally be uniform in shape (e.g., hemispherical). However, such a card can be heated to the point the droplets become pliable, and a randomly textured medium (e.g., plate, roller-wheel, etc.) can then be impressed into the laminate surface, causing the droplets to deform in random ways. When cooled, the card will have a radically different albedo profile than formerly. The process can be repeated as many times as desired. (A laminate without micro-droplets, but simply comprising a layer of generally flat thermoplastic material, can similarly be employed.)

Instead of impressing the laminate with a physical texturing medium, the laminate may be spot-heated, e.g., using a raster-scanned CO2 laser—pulsed in a random (or a controlled) manner. Temperature differentials induced by such technique can cause the plastic material to deform.

Figure 13A:
FIG. 13 shows how microdroplets of thermoplastic resin on a driver license laminate may be heated by an obliquely applied laser source, applied from different directions, to reshape the laminate surface, and thus the license's albedo function.
Figure 13B:
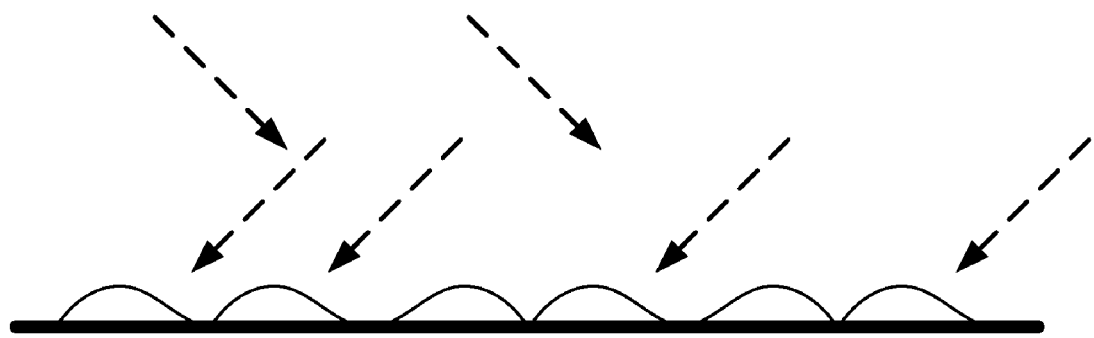

In one particular arrangement, a pulsed laser obliquely illuminates a laminate having microdroplets, as shown in FIG. 13. By illuminating the droplets from different directions, different deformities can be induced. This can be effected by using plural lasers, or with a single laser and a mirror arrangement (e.g., an electronically-steerable micromirror array). Or by use of a single laser, and moving the card, etc.

Instead of illuminating the plastic material from different directions to yield differently-shaped distortions, the plastic may be illuminated from the same direction, but for different periods of time. Other such arrangements will be evident to the artisan.

Still another arrangement bonds a micromirror array/microlens layer onto a card substrate. (The lenses can be movable with the mirrors, or fixed.) Instead of being electronically steered, the micromirrors can rest on microdroplets of deformable plastic, and point in a direction dependent on the shape of the respective underlying microdroplet. The mirrors can be relative transparent at infrared, allowing emission from a CO2 laser to heat the droplets of deformable plastic through the mirror elements. By heating the microdroplets from different directions, and/or for different times, the directions in which the mirrors points can be varied and controlled. Such a material can be "written" from one angle, and "erased" from another (and read straight-on).

Yet another arrangement places a CCD lens array atop a photo resist layer, on a card. The card can be read from one angle, and written from another (and read straight-on).

A point-of-sale terminal can illumine the card at the angle necessary to read the data.

In still other arrangements, a card may be re-shaped without arrangements as elaborate as detailed above. A card may simply be passed through a feeding mechanism that impresses a shaped roller against its face. (A simple arrangement is a sand paper-roller.) Even without elevating the temperature of the card, its albedo function may be altered.

Still other arrangements employ intaglio techniques (either inked, or inkless) to shape the surface of a medium in a desired fashion. Such techniques are known to the artisan from references such as Deinhammer, "The Implication of Direct Laser Engraved Intaglio Plates on Banknote Security," SPIE Vol. 6075, February, 2006, as well as U.S. Pat. Nos. 6,840,721, 20030145747, 20040025728, 20040232108, 20050072326, 20050115425, 20050139100, 20050193909, and 20060151989, and international patent publications WO05/002869 and WO06/045128.

The foregoing and other techniques allow shapes including Morse topologies to be formed on an object. Morse surfaces can be used to tailor directional albedo in arbitrary fashions (e.g., by changing the elevation of topological peaks, changing the position of saddle points, changing the depths of local depressions, etc.). (Cf Milton, "Morse Theory," Princeton University Press, 1963, ISBN 0-691-08008-9; and Zomorodian, "Topology for Computing," Cambridge Monographs on Applied and Computational Mathematics, 2005.)

Metameric inks, whose response decays or changes over time, can be employed to introduce a temporal variability to the wobble response. Thermics provide another dimension, varying the outputted response in response to temperature. Different directional albedo signals may thus be sensed in different domains, e.g., luminance, red, green, blue, metameric, etc.

By such technologies, data densities on the order of up to 10,000 Morse-els per square inch may be achieved (homage to Morse). The directional albedo (luminance) of each element can represent on the order of 2-8 bits per data from angle alone. The other dimensions of data provide still more bandwidth.

In still other arrangements, the albedo function of a surface is varied not by application of physical or thermal stimulus, but rather by electrical or molecular changes that serve to vary local reflection.

Altering the albedo function of a card can be done each time the card is involved in a transaction, or only at certain times. A point-of-sale transaction terminal can include components for reading the albedo function and for changing the albedo function, so that a read-modify-reread sequence of operations can be performed. (The data collected in the 'reread' operation can be stored locally or centrally for reference, e.g., used in a subsequent read operation to verify the card.)

The albedo function can also be a function of the ink used to print the card. For example, pearlescent or metameric inks can be used. Magnetic inks can also be used to impose some directionality (which may be random) on the illumination reflectance profile.

More advanced materials can also be employed, such as "quantum dots" (semiconductor nanocrystals). Quantum dots are available commercially from vendors including Evident Technologies (Troy, N.Y.), UT Dots, Inc. (Savoy, Ill.), and American Dye Source, Inc. (Quebec, Canada). They can be incorporated, e.g., in bead or dust form, into inks, plastics, and coatings used on licenses. These materials exhibit a narrow and customized emission spectrum, with an emission amplitude that is dependent on excitation wavelength. Such materials have known applications in anti-counterfeiting. As explained at the Evident Technologies web site:

Two critical aspects of quantum dots give them the ability to act as an encrypting device for anti-counterfeiting: their narrow and specifiable emission peaks, and their excitation wavelength dependent emission intensity. With these traits, several different sizes (and therefore emission wavelengths) of dots can be combined with several different wavelengths of excitation light in order to create an almost infinite variety of emission spectra. Each of these spectra correspond to one coding combination, which can be made as arbitrarily complicated to duplicate as the encoder wishes. This process works as follows.

Each quantum dot size corresponds to a given emission peak. If dots with different emission peaks are mixed together in known quantities, the resulting emission spectrum contains each emission peak present at some measurable intensity. This intensity will be dependent on both the quantity of dots present and the excitation intensity (or intensities, if several sources are used). By fabricating materials containing predetermined amounts of quantum dots which emit at arbitrary wavelengths, and then establishing their emission spectra at arbitrary excitation wavelengths, one can create a "code" based on the relative intensities of emission peaks. For example, if one combines equal amounts of 1000 nm, 1500 nm, and 2000 nm emission dots, and excites them at 800 nm; it would yield a different spectral code than unequal amounts of 1100 nm, 1600 nm, and 2100 nm emission dots excited at 900 nm. By changing the number of dots, their individual concentrations, their emission peaks, or their excitation wavelength, one can create and record a nearly unlimited variety of different spectral codes which can be easily inserted into plastic sheaths, inks, dyes, fabric, or paper, allowing quantum dot anti-counterfeiting encryption to go anywhere.

In a point of sale terminal that illuminates—with a particular illumination spectrum—a card having quantum-dots, the resulting emission peaks can be detected by the terminal and employed as a form of machine-readable data—just like bar codes, RFIDs, digital watermarks, etc. The data thus represented can be employed in the various applications known for such other machine-readable data, including use in conjunction with other machine-readable data conveyed by the card, in cryptographic key applications, as a fingerprint, etc.

One particular arrangement employs several layers of quantum dots, each layer having different characteristics (e.g., emission spectra). The layers are separated by (or include) photoreactive layers that can be made successively transparent by appropriate stimulus.

From the top layer of quantum dots, a first characteristic spectra is emitted (a simple example may be pure red light) in response to a particular illumination. If the photoreactive material beneath (or around) the first layer of quantum dots is made clear, the quantum dot illumination also extends down to the buried, second layer. Its different emission spectra (e.g., blue light) changes the net spectra sensed from the card. Likewise, if the photoreactive material beneath (or included in) the second layer of dots is made clear, the quantum dot illumination extends down to the buried, third layer. Its emission spectra (e.g., yellow light) combines with that of the other layers to result in a third, unique, net emission spectra. The varying emission spectra can be sensed from the card (e.g., in a simple arrangement, as 8-bit data from red-/green-/blue-filtered CCD elements), and the resulting data can serve as a changeable (renewable) key, with well-known cryptographic benefits.

A similar arrangement can include two layers of quantum dots, separated by an intervening layer that is originally transparent, but which can be made relatively opaque by application of stimulus (e.g., laser energy in a certain band) thereto. (Or, the photosensitive material can form part of the layer in which the dots are included, instead of comprising a separate layer.)

By arrangements such as the foregoing (which may be combined), the wobble function of an object may be tailored as desired. Thus, instead of an uncontrollably random function, a controlled (and optionally pseudo-random) function may be achieved.

Exercising control over the wobble function allows known information-theoretic principles to be applied, enabling the wobble function to represent a desired payload that can be reliably detected despite physical corruption of the object and distortion of individual wobbles.

One such principle is use of error correcting codes, such as turbo coding, BCH coding, Reed-Solomon block codes, convolutional codes, etc. Such techniques rely, e.g., on oversampling, i.e., representing N bits of payload data as M bits of signal, where M>N. The redundancy inherent in such arrangements allows errors to be noted and corrected. Such techniques can also employ likelihood measures—indicating the relative probability that a given bit has a given value (akin to the confidence factor tables presented above).

Another principle that can be brought to bear is predictive filtering. Such techniques are taught, e.g., in U.S. Pat. Nos. 7,076,082 and 6,614,914. In one particular embodiment, a 3×3 region of a-pels is considered. In normal media, the wobble of the center a-pel may normally be expected to be correlated to the wobbles of the 8 surrounding a-pels. If the vector average of these surrounding a-pels is calculated, the result can be used as a baseline against which the wobble of the center a-pel can be judged for variance from this natural mean. By such technique, signals corresponding to the deliberately-induced wobble features can be raised out of the "noise" of the (typically lower frequency) wobble characteristic that may naturally occur in a medium.

Using the cited techniques, a card having 50,000 virtual a-pels arrayed across its surface may reliably convey a key code comprising, e.g., 500-5000 bits or more. Such key codes can be used in myriad known manners, some of which are detailed in the references cited at the beginning of this specification.

One particular application of wobbles is in challenge/response systems. The goal of such systems is to render useless any knowledge that an attacker may glean through interception of communications between parties. This is traditionally accomplished with one-time passwords. One approach (of many) to the construction and use of one-way passwords is to use a challenge and response system. Traditionally, three components are used on the client side of such systems: a base secret, a random challenge, and a hash/encryption function (or other mathematically one-way function).

A challenge is issued by the authenticating party. The client combines the challenge with the base secret and runs the result through a one-way function. The resulting output is transmitted (e.g., back to the authenticating party) for validation. The recipient of the output performs the same calculation, and compares the calculated and received results. Through such use of the one-way function, the base secret is never transmitted in the clear between the parties.

Employing wobbles, the physical card (or other object) can serve as the base secret and/or the one-way function. The random challenge can consist of an instruction to image the card under conditions of specific illumination, position, etc. A sample authentication scenario may proceed as follows:

1. Server issues a challenge to the client (rotation of token . . . say 45 degrees);
2. Client communicates the challenge to the end user ("Hold card at approximately 45 degrees"); user images the rotated card;
3. Client reads a watermark from the card to determine card's rotational alignment, and senses wobble signals; resulting wobble data is sent to the server;
4. The server, based on wobble measurements earlier taken from the card, determines the wobbles that should be sensed from a card at the specified rotation;
5. The server compares the results received from the client, versus those it calculated; if they correlate as expected, the client is authenticated.

It will be recognized that if the wobble data sent from the client is of a coarse "quadrant" variety (e.g., as explained in connection with the tables above, wherein the lean of the wobble is identified within one of four quadrants), then rotating the card even a fraction of a degree causes certain of the wobble vectors to progress into the next quadrant—but not others. The server—with its more accurate quantification of the wobble directions—can accurately model which wobbles will transition into each quadrant, for any given rotation. But interception of one coarse wobble signal does not allow an attacker to predict the signal when the card is slightly rotated. (Of course, rotating 90 degrees should cause each wobble to progress into the next quadrant.)

The just-detailed arrangement requires issuance of a specific challenge to the user, and requires the user to hold the card in an appropriate fashion. The "S/Key" challenge and response protocol (sometimes known as Lamport's scheme, and commonly used as a onetime password system) eliminates this communication, and instead operates on succeeding hashes to be created from a common base secret. As one work has explained:

The [S/Key] technique uses a sequence of hashes, each computed from the previous one in the sequence. The server stores the last hash in the sequence. To log on, the client provides the next-to-last hash in the sequence as a one-time password. The server takes the client's one-time password, hashes it, and compares it to the stored hash. Both should match. Then the server replaces the hash in the client's password entry with the password just provided.

In the case of wobbles, before a card (or other token object) is issued to the user, it is configured to encode a large number of temporary passwords, all calculated off the base secret. (Once the passwords are used up, the card can be disposed of.) Each unique signature calculated from the wobbles is another one-time use password calculated on the base secret (the construction of the card).

At first blush, there may seem to be no significant difference between the two techniques, as a challenge in the first is equivalent, in the second, to needing to know which password in the sequence needs to be submitted to the server for authentication.

By loosening the definition from "password in sequence" to "an unused password," then the instructions ("challenge") to the end user becomes the much simpler "wave the card in front of the camera" set.

Thus, in the simplest embodiment, the client would pass either all the observed frames, or calculated wobble vectors, to the server.

An optimization to this is, at the time of session initiation with the server, the server transmits all positions (based on the watermark) that have been used. This allows the client to provide better feedback to the user during the validation step.

In embodiments in which a cell phone device (which term is used to encompass devices such as PDAs, iPhones, Blackberries, etc., whether communicating over a cell network, or WiFi, or WiMax, or Bluetooth, or otherwise) is used as an optical sensor, the wobble data thereby acquired can be used in conjunction with other operations performed by the device. For example, it can authenticate the cell phone to conduct a particular transaction, serve to enter a password to gain access to a protected network domain, authorize use of a user's credit card data, etc.

Authentication Chimes

Wobbles can be used in conjunction with other technologies to provide highly counterfeit-resistant articles.

Consider a driver's license with three types of encoded data. One is a traditional luminance-based digital watermark. The watermark conveys steganographic calibration data by which the orientation of the card in 6 dimensions can be assessed, by reference to image data captured from the card as detailed above. (This mark may convey other information as well.) Such mark can be formed by any known technology, including printing, texturing, etc.

A second type of encoded data is represented (e.g., by digital watermarking) using chrominance features that are out of gamut for conventional printing technologies (e.g., they cannot be accurately reproduced using CMYK colors), or are otherwise not readily reproducible (e.g., due to the dither or halftone patterns used). Metameric or pearlescent inks can be used, as can fluorescent inks. When such a reproduction is imaged, e.g., with a RGB CCD sensor array, the resulting data differs from that obtained when the original is so-imaged.

A third type of data is represented using directional albedo, as described herein.

The presently-contemplated arrangement uses the first encoded data to allow the relative position/orientation of the card to be determined. Once the relevant geometrical reference data is thereby established, the second and third data are examined for correlation.

In one particular embodiment, the third data (albedo function) is random. That is, the license (card) is not deliberately shaped to achieve a particular albedo function. Instead, the payload represented by the second data may be deliberately chosen to exhibit desired correlations with this albedo data (e.g., by overprinting; different regions may be used to avoid interference).

The second data in this particular arrangement conveys several different payloads ("keys"). The division of the data into the different keys can be arbitrary. One technique is to assign different regions of the card to different keys. For example, the card surface can be partitioned into 40 regions, each 0.5"×0.5", each conveying a different key (represented, e.g., by an array of a-pels numbering on the order of 1,000 to 10,000). Of course, in other embodiments different arrangements can be used—including arrangements in which each region includes plural non-contiguous areas. (One such arrangement assigns successive pels to successive ones of the 40 keys, stepping across the card from the top left corner to the top right corner, and then continuing in this fashion for succeeding rows. Or, instead of single a-pels, successive tiles of a-pels can be thus-assigned, such as 5×8 a-pel tiles, or 16×16 a-pel tiles, etc. Still other divisions can, of course, be imagined.)

The third data (directional albedo) is virtually segregated into a like number of keys (in this particular embodiment). The division of the data into plural keys can follow the same division algorithm as applied to the second data, or a different arrangement can be employed (e.g., key #1 in the second data can correspond to chrominance features located in the upper left corner of the card, whereas key #1 in the third data can correspond to wobble attributes in the lower right corner of the card).

To further detail this particular embodiment, imagine that each of the 40 "keys" represents a 10 bit binary string. In the third data, the wobble of each a-pel may represent two bits (e.g., leaning east or west, and leaning north or south). The ensemble of bits thus-represented by a-pels of key #1 can be mapped to a net 10 bit payload. In the second data, the chrominance features corresponding key #1 are selected to encode these same 10 bits. Likewise for each of the other 39 keys. (Error-correcting representations, such as Reed-Solomon, Turbo, or BCH coding can be employed, but in other arrangements a noisier data signal is desired—with errors uncorrected.)

As before, sensing of the three types of data from the card can be accomplished by a great variety of different sensors; the optical 2D CCD sensor in a cell phone is exemplary. The cell phone processor, or a remote processor, can perform the related data decoding and correlation operations.

In this exemplary embodiment, the 10-bits represented by the wobbles associated with key #1 are correlated with the 10-bits decoded from the chrominance data associated with key #1. Perfect correlation is not expected nor required. If the correlation coefficient exceeds a threshold (e.g., if 7 or 8 of the 10 bit positions match), then a match of key #1 is found.

Similar operations are undertaken for the other 39 keys.

Each time suitable correlation is found between respective keys, the detector device (e.g., the cell phone) renders a short tone (e.g., for a quarter of a second). Several keys may each correspond to the same tone. Thus, keys 1, 6, 11, 16, 21, 26, 31 and 36 may all correspond to 261 Hz (middle C). Keys 2, 7, 12, 17, 22, 27, 32 and 37 may all correspond to the E above middle C. Keys 3, 8, 13, 18, 23, 28, 33 and 38 may correspond to the G above middle C; keys 4, 9, 14, 19, 24, 29, 34, and 39 may correspond to the B-flat above middle C, and keys 5, 10, 15, 20, 25, 30, 35 and 40 may correspond to the C above middle C.

At any given moment, the sensed 10-bit keys may not all match within the specified degree of correlation (e.g., due to glare, motion blur, and other anomalies). However, generally speaking, waving the cell phone relative to the card should produce a pleasing chord, comprised of the five notes mentioned above.

In other arrangements, a lesser number of keys is represented by the second and third data. For example, just four or five keys may be represented. Each may correspond to a different one of the above-noted tones. (They may comprise 10-bit keys, or longer strings, such as 40-80 bit keys.) Moving the cell phone over the card still results in a distinctive chord that indicates that the card is the original—not a reproduction.

In some embodiments, care is taken that each of the keys is relatively uncorrelated. Thus, the chrominance—represented key #1 should only match wobble-expressed key #1, not wobble-expressed key #2, etc. In such embodiments, if a match is found between different keys (e.g., chrominance-represented key #1 and wobble-expressed key #4), then a discordant or minor tone can be introduced (e.g., C sharp or D flat)—immediately cueing the listener that something is amiss.

Thus, this particular embodiment operates by processing signals gleaned from 2D and 3D data structures (chrominance pattern and directional albedo features) and, if suitable correlations are found, a distinctive authentication signal is then sensed by the user. Correlations thus drive an experiential (human) decision engine, rather than a Bayesian-like automated decision process (although such technologies can of course be used). While an occasional random correlation might sometimes be found, the resulting short tone is readily distinguished from the full chord that characterizes an authentic license.

While the third (wobble) data in the foregoing embodiment is random, this need not be the case. Instead, the card construction can be deliberately tailored to achieve a desired albedo function, so that specific keys can be thereby represented.

Nor is it essential that correspondence between the second (chrominance) and third (wobble) data be indicated by tones. For example, graphical feedback can alternatively be employed. In one particular arrangement, a graphical feature (as disclosed, e.g., in copending application Ser. No. 11/670,841, filed Feb. 2, 2007) can be presented on a device display. Extending the tones/chord arrangement, different graphic primitives can be made to appear—each corresponding to a different one of plural correlations. In the aggregate, the primitives form a familiar shape or logo (which may be, e.g., the word VALID). As the sensor is waved over the object, a shimmering graphic appears on the display—with different elements appearing and disappearing as respective correlation thresholds are met and lost.

The three types of data are described as distinct for expository convenience. However, two or more of these can be formed by the same process, and may comprise the same structure. For example, raised-ink intaglio can be used to shape the surface of the card to tailor the wobbles, and the particular ink(s) used can form the chrominance signal. Likewise, the luminance can also be tailored by these inks.

If information about the optical detector is known a priori, then this information can be employed advantageously in designing one or more of the various data structures. For example, if the particular pattern of sensor elements is known, together with their respective colors, then the chrominance mark can be designed with this information in mind. In an exemplary arrangement, one or more metameric inks can be selected and patterned so that a reproduction of the chrominance signal (using, e.g., CMYK inks, and conventional printing dither patterns) cannot faithfully mimic the signal produced by the sensor in response to the original chrominance feature—yielding corruption of the second data.

Further Disclosure

A sample embodiment makes use of the 2-Pi-steradian albedo—to use the 'proper' science phrase—better known as the directional reflectance profile—for each and every resolution element or local group of resolution elements on a card. At a reading station, a card is moved in front of a sensor, presenting the card from different angles, as opposed to being flatly scanned on a scanner.

Each square millimeter of the card, for example, has its commonly understood "grey value," "density," "reflectance," etc. This common understanding is an approximation to the (spectral)-directional-albedo profile. Sophisticated models often distinguish between objects which are illuminated in a diffuse "from all directions" type of lighting source, and the more special case where an object is being illuminated from a specific angle or otherwise selectively as a function of angle. The latter case thus has two forms of directionality: source direction and reflective direction. The resultant "albedo map" is thus a function of 4 dimensions: the reflectance of a unit of light energy transmitted from a given 2D direction and detected at a separate 2D direction.

The distinction between coherent (e.g., laser) versus incoherent illumination may be included for special situations, but the case of coherent light brings with it "interference" which modulates these directional albedo functions at very fine directional scales. In the present discussion, coherent light illumination isn't considered (although it can certainly be used in various embodiments). Instead, the exemplary arrangement focuses on low end cameras in effectively diffuse illumination situations.

Another special case in all of this is 3M's retroreflective technology, which viewed in the above 4D description is the 4D albedo map where the reflectance is '1' for all 4D points where the first two coordinates are identical to the second two coordinates, and '0' everywhere else. No real document or physical system approaches this ideal.

In a forensic setting, where lighting can be controlled as to affect all 2-Pi steradian angles of illumination on an object, and likewise a suitably distant (say 2 meters away) high-quality camera can separately take images of the illuminated object from all 2-Pi steradian angles (independently), an empirical set-up is thus established that can sample the 4D albedo map for any given object. Practically, one would need to move a light source to successive given directions relative to the object, where at each illumination direction the camera is moved through all of its sampling directions. A mere 32 illumination directions matched to 32 detection directions gives 1024 high resolution images to be taken for what amounts to be a fairly coarse sampling of the full 4D albedo map.

For most low end camera applications, we can greatly simplify our forensic lab and the subsequent discussion by either accepting generally diffuse lighting as the standard illumination mode, or perhaps boil down illumination to six categories: generally diffuse and five semi-diffuse from straight-on, up, down, left and right. The six-mode approach should be adequate for almost all general-low-end-camera applications—possibly even a bit of overkill.

So, proposition number one is that in a forensic lab with a good 12-bit grayscale camera sampling at, say, 128 different directions on any given single illumination condition, identically produced cards will nevertheless give rise to quite distinguishable albedo maps simply due to manufacturing processes involved with the stock, printing, laminates, etc. If this is not the case, it should not negate the overall approach described here, but it will possibly make it more challenging as an engineering matter. Be this as it may, albedo map "variational differences" on the order of at least a few percent if not 5 to 10 percent should be expected and readily detectable. "Variational" refers to wobbles as a function of read-angle, and is deliberately an informal and secondary term, where the main point is that the maps are sufficiently different.

Assuming the forensic lab albedo map differences are confirmed across a wide range of examples, this leads to the first test for garden variety cameras: by waving two identically-produced "regular-old" cards in front of a camera in a controlled, reproducible way, ensuring at least a 20 degree read-angle swath, will one card consistently produce a data set which is distinguishable from the other, where for example 15 frames of image data are collected? The answer is expected to be 'yes,' but it would not be surprising if the difference was so slight that only carefully controlled conditions applied multiple times would be necessary to meet basic distinguishability statistics. The plausibility argument that there will be meaningful signal gets down to the fact that some ten or twenty thousand effective locations on the card would be sampled 15 times each, producing a lot of data for one binary decision: same or different. This baseline scenario ultimately boils down to straightforward Bayesian decision statistical descriptions.

How might such an arrangement be hedged? A first line of hedge is to search for manufacturing methods which enhance the resulting Bayesian statistics, period. Things as simple as loosening the tolerances on laminate thicknesses is but one simple and potentially powerful experiment. Other loosened tolerances, and introduction of random functions, could similarly be used, alone or in combination—many at low or no cost (or effecting a cost savings). Skipping ahead, one would hope that two or three key methods could start to make the Bayesian "swipe signatures" (if you will) substantially and reliably different from each other.

Next up is the hedge-of-hedges, represented in the extreme by such things as the 3M retroreflective materials. The key concepts here are "by-design" and some position on the "no-cost to costly scale." The general game here is to continue to enhance the Bayesian properties, while now beginning to pay more attention to angular wobble properties and how they relate to such loose specifications as "minimum 20 degree angular presentation of the card." Also, alluding to how camera data needs to be captured, compressed and shipped to some trusted decision unit, these practical considerations have to be taken into account as by-design albedo-map properties are created and tested (and obviously taking into account cost in all its various forms).

This immediately preceding discussion presumed the "two identical cards presented to a camera in a reproducible, controlled manner." This is obviously not how cards will be used, but it was important to establish the baseline differences between otherwise identically produced cards.

So now we move to normal usage. Presumption number two is that kids to grandmothers can easily be taught (virtually entirely by tactile experience) to present cards to cameras within some technically defined specification on distance, angular movement, speed, number of captured frames, etc. User testing should be able to establish "99% behavioral bounds" which then become the hard targets that engineers treat as design gospel and Bayesian constraints. Normal usage will include the six modes of lighting conditions, the specs of any given camera, the numbers of frames acquired and the above-defined limits of behavioral bounds.

A digital watermark, e.g., as detailed in U.S. Pat. Nos. 6,614,914 and 6,947,571, will provide the informational basis for precise 6 dimensional measurement of the movement of a card in front of the camera: X, Y, Z, pitch, yaw, roll. The basis is thus formed to uniquely determine how our ten to twenty thousand albedo-beacons travel through space and which read-angle is being presented to any given frame. We have our guide to map any given movement back into a card's unique albedo map, forming a comparison between a live event and a re-enacted trace through a stored, trusted map.

At all but an extreme theoretical level, we're at a pretty good point right here. All grandma may be doing is sending instance after instance of these ~20K by 15 albedo swaths back to a trusted decisionmaker for adjudication. The very low-end nature of the camera will ensure that these essentially randomly-complicated and very subtle signatures are quite buried in various noise and distortion soups, a first hint at what's good for the decisionmaker (because we've already designed in plenty of signal in the cacophony of noise) and problematic for the would-be counterfeiter. The allusion to "random" refers to the idea that the wobbles will be fairly "random about the Lambertian-profile expectation" in and around the straight-on to 20/30/40 degrees off-angle directions. The Lambertian-profile is the one you would expect on average from a normally reflective surface. The general notion at this point is that this card can be presented thousands of times, each time producing essentially new data blobs.

So we next consider the attacker with a well-equipped lab. Will such an attacker be able to discover and record the unique albedo map of a given card, given the possession of the physical card? Of course . . . they can rig up a comparable forensic lab set-up. The practical issue gets down to how long does someone need access to a card in order to gather sufficient forensic data. Certainly longer than the card-swiping-in-the-pocket waiter at the fancy restaurant; but a half-minute in the process outlined above, which characterizes the card at the DMV at the time of its issuance, will do.

Will a data-tapper be able to tap the unencrypted data blob feed from hundreds of presentations of the card and slowly be able to recreate the unique albedo map of the card? Of course, assuming they also are tapping the watermark-provided 6D swath vector as well, or use some other form of 6D registration in order to form a stable basis to start averaging the albedo map. With enough presentations (along with reliable 6D data), the lower frequency albedo map data (wobbles) will begin to show up.

So, physical possession of the card, as well as tapping 6D-enabled-hundreds-of-presentations-unencrypted-data-blobs will both enable sleuthing of the card's albedo maps. Let's call this entity the "crude-sleuthed-map" or CSM.

The next question is, given this CSM knowledge, what can the rogue do with it? Can they physically reproduce a card that sufficiently mimics the map so as to fall into the industry standard Bayesian decision statistics (which would be a published standard by a decisionmaker or decisionmaker classes)?

Data-wise, they will clearly be able to simulate a low-end camera, impress the CSM onto that data, package it up and ship it to the decisionmaker as if they were grandma doing it. They could pseudo-randomize presentation 6D swaths as well, new instances of camera noise, even lay down a base layer of a "nearly identical" card data replete with digital watermarking data, then overlaying the CSM layer. One can imagine a fair amount of sophistication in simulating the presentation of a card to a camera, given the CSM. In any event, this one needs to be clearly flagged as a usage-model dependent attack well worth fully exploring in each and every situation, market, application, whatever.

Certainly there are other kinds of data-domain-only attacks that need to be defined, elucidated, studied, counter-attacked and catalogued. For instance, where does threshold attacking of the Bayesian decisionmaker fit in, if at all? It is unclear if you will ever get a "yes" in the first place from a decisionmaker if one doesn't have the card or the CSM, or maybe you get a lucky "yes" every billion tries and this becomes the seed of a threshold attack? Then there's the whole question of the security of the decisionmaking methods, systems, networks, etc., which all seem to fall into application/market specific cryptographic definition and cataloguing.

The question of physical reproduction given the CSM is a more interesting question. Here, the CSM is synonymous with having the card.

To start with, we've already established in our designing above that the same relatively high end and sophisticated machine cranking out card after identical card has no chance of recreating the CSM, even given knowledge of the CSM. (This latter statement is ultimately a function of the design methods we settle on and how "pro-active" they are versus "reactive," but it is a safe presumption that the high end origination machine will not be able to even come close to reproducing the card's albedo map even given full knowledge of the CSM).

So that leaves the option of a specially designed machine that attempts to not only duplicate the nominal identical design of the card, but then impress upon it an artificial duplication of the CSM in a way that does not include additional albedo map wobbles that will throw the reproduced card's CSM out of the published Bayesian bounds.

First of all, building such a machine would be an extreme challenge at many levels, with but one being that the published Bayesian bounds—that the machine ultimately has to answer to—do not need to be limited and can evolve. Probably the biggest challenge would be proactively sculpting the surface properties of a laminate or equivalent, or some 80-90% of the 20K surface elements that is, to the required wobbly patterns of the stored CSM. Even if those wobbles are extremely low frequency and tame, which they generally won't be, it simply is difficult to conceive of a machine which could do this. Mask-based etching? Nano-machines? Microsurgery equipment?

And then there would be the residual albedo-signature noise to contend with. The original registration of the albedo map of the original card might presumably also characterize the higher frequency statistical attributes of the albedo map. The original stored CSM used by the decisionmaker could capture this data and use various measures as a kind of a simple "check-sum" on a given read, forcing our miraculous machine to first understand these properties as part of the CSM dataset, and then furthermore reproduce these statistics.

In any event, serious study and cataloguing of potential CSM-reproducing machines is required. Presumption number three to this whole approach is that this miraculous machine will, at the very least, be exceedingly expensive, and better yet essentially beyond the reach of current and near-term technology.

So, attack-wise, given knowledge of the CSM, you've got the datawse simulation of a camera presentation and you've got the miraculous but at the very least quite expensive CSM-reproducing machine. Each requires the not so trivial step of gaining knowledge of the CSM.

Going back to the CSM-reproducing machine, at this point might it be equated to the mythical three-embedded-room-deep machine at the NSA which molecularly CATSCANS smart cards in order to sleuth their secrets? It would not be surprising if a proof is established that the technical challenges in creating a CSM-reproducing machine are on the same tall-order scale as creating the machines intended to bust smart cards and other tamper-proof electronics.

Concluding Remarks

This specification covers a lot of ground—much of it new. The breadth of application of the disclosed technologies is large, as will be apparent to artisans skilled in the field.

For example, it will be apparent to artisans that elements of the disclosed arrangements can be employed in on-line purchasing of goods and services, and on-line bill paying. Application of pseudo random cryptographic keys—of the sort represented by, e.g., wobble data—to such activities are well understood. This is but one of many examples where the present specification enables novel applications.

It is expressly contemplated that the technologies, features and analytical methods detailed in this specification can be incorporated into the methods/systems detailed in the earlier-referenced documents. Moreover, the technologies, features, and analytical methods detailed in those documents can be incorporated into the methods/systems detailed herein. (It will be recognized that the brief synopses of such prior documents provided above naturally do not reflect all of the features found in such disclosures.)

It will be recognized that elements of the arrangements detailed herein can be used advantageously in other contexts. For example, while a directional albedo function has been employed in detailed arrangements, this function has advantageous utility elsewhere. Conversely, alternative implementations using technology detailed herein do not need to involve a directional albedo function.

More generally, it should be recognized that this specification discloses a great number of arrangements and included sub-combinations that are useful and non-obvious apart from the larger embodiments particularly described. Thus, no particular element or act recited herein is believed to be essential to definition of patentable subject matter. Methods and apparatuses in which detailed elements/acts are omitted, or substituted with other elements/acts, are expressly contemplated. Thus, by way of example and not limitation, an identity card is not essential (the detailed embodiments can be practiced, e.g., to identify a particular physical object, such as a wristwatch); an optical sensor is not essential (identification can be based on different physical measurements, such as of acoustical properties); a random track of an object before a sensor is not essential (a carefully controlled track may be employed), watermarked data is not essential (e.g., position—if relevant—can be determined by other means), etc., etc.

Moreover, novelty does not reside only in the overall system, but also in subcombinations disclosed herein. For example, the measurement apparatus of FIG. 3 is believed patentable per se, as is the concept of uniquely identifying an article by reference to its directional albedo function, as well as imparting a deliberately random feature to a license prior to issuance, so too perturbing watermark-estimated orientation data to generate refined orientation data, and likewise weighting wobble data in accordance with a confidence factor in determining a match, etc., etc. (Some such subcombinations are particularly noted in the listing that follows, although such listing is not exhaustive.)

Applicants expressly note that results achieved by certain combinations and subcombinations may be achieved by other combinations/subcombinations that are straightforward to artisans in the field—informed by the teaching of this specification. For example, while this specification teaches that a card may be imparted a random surface texture by hitting it with a meat tenderizing mallet, the artisan will immediately recognize that such a result may be achieved by myriad other straightforward means (e.g., rubbing with sandpaper, laser etching, etc.)

Arrangements using concepts detailed herein can also make use of machine-readable technologies (e.g., bar codes, RFIDs, magnetic stripes, etc.), or can be substituted for such technologies in previously known arrangements.

Having described and illustrated various principles of our work by reference to particular examples, it should be apparent that the detailed technology can be modified in arrangement and detail without departing from such principles. Accordingly, we claim all such embodiments as come within the scope and spirit of the following claims and equivalents thereto.

EXHIBIT A

Robust Key Extraction from Physical Uncloneable Functions

B. Škorić, P. Tuyls, and W. Ophey

Philips Research Laboratories
Prof. Holstlaan 4, 5656 AA Eindhoven, The Netherlands

Abstract. Physical Uncloneable Functions (PUFs) can be used as a cost-effective means to store key material in an uncloneable way. Due to the fact that the key material is obtained by performing measurements on a physical system, noise is inevitably present in each readout. In this paper we present a number of methods that improve the robustness of bit-string extraction from noisy PUF measurements in general, and in particular for optical PUFs. We describe a practical implementation in the case of optical PUFs and show experimental results.

Keywords: Physical Uncloneable Function, authentication, speckle pattern, Challenge-Response Pair, noise, error correction

1 Introduction

1.1 General Introduction to PUFs

A 'Physical Uncloneable Function' (PUF) is a function that is realized by a physical system, such that the function is easy to evaluate but the physical system is hard to characterize, model or reproduce.

Physical tokens were first used as identifiers in the 1980s in the context of strategic arms limitation treaty monitoring [1]. The concept was investigated for civilian purposes in the 1990s [2]. The tokens which were then studied are very hard to reproduce physically, but quite easy to read out completely, i.e. all the physical parameters necessary for successful identification are readily given up by the token. This makes these tokens suitable for systems where the verifier knows with certainty that an actual token is being probed and that the measuring device can be trusted. However, the tokens are not suitable for online identification protocols with an invisible party. An imposter can easily copy the data from someone's token, and then enter that data through a keyboard. The verifier cannot see the difference between the real token and the cloned data.

Truly uncloneable tokens (PUFs) were introduced by Pappu [3, 4]. These are so complex that it is infeasible to fully read out the data contained in a token or to make a computer model that predicts the outputs of a token [5]. This makes PUFs suitable for online protocols as well as verification involving physical probing by untrusted devices.

A PUF is a physical system designed such that it interacts in a complicated way with stimuli (*challenges*) and leads to unique but unpredictable *responses*. A PUF challenge and the corresponding response are together called a *Challenge-Reponse-Pair* (CRP). A PUF behaves like a keyed hash function; The physical system consisting of many 'random' components is equivalent to the key. In order to be hard to characterize, the system should not allow efficient extraction of the relevant properties of its interacting components by measurements. Physical systems that are produced by an uncontrolled production process, e.g. random mixing of several substances, turn out to be good candidates for PUFs. Because of this randomness, it is hard to produce a physical copy of the PUF. Furthermore, if the physical function is based on many complex interactions, then mathematical modeling is also very hard. These two properties together are referred to as *Uncloneability*.

1.2 Applications

From a security perspective the uniqueness of the responses and uncloneability of the PUF are very useful properties. Because of these properties, PUFs can be used as unique identifiers, means of tamper-detection and/or as a cost-effective source for key generation (common randomness) between two parties. By embedding a PUF inseparably into a device, the device becomes uniquely identifiable and uncloneable. Here 'inseparable' means that any attempt to remove the PUF will with very high probability damage the PUF and destroy the key material it contains. A wide range of devices can be equipped with a PUF in this way, e.g. smart-cards, credit cards, RFID tags, value papers, optical discs (DRM), chips, security cameras, etc.

An identification scheme based on CRPs works as follows. First, one needs a detector for measuring the analog output of a PUF and an algorithm that extracts bit-strings from this output. The detector and the processor executing the algorithm can be located on the device with the embedded PUF, or inside a separate external reader device. The scheme consists of two phases: *enrollment* and *verification*. In the enrollment phase, the Verifier produces the PUF, embeds it in a device, and stores an initial set of CRPs securely in his database. Then the device is given to a user. The verification phase starts when the user presents his device to a terminal. The Verifier sends a randomly chosen PUF challenge from his database to the user. If the Verifier receives the correct answer[1] from the device, the device is identified. Furthermore, a secure authenticated channel can be set up between the verifier and the device, using a session key based on the PUF response.

A special class of applications becomes possible if so-called 'control' is introduced [6]. A *Controlled PUF* (CPUF) is a PUF that is bound to a processor which completely governs the input and output. The chip can prohibit frequent challenging of the PUF and forbid certain classes of challenge. It can scramble incoming challenges. Furthermore, it can hide the physical output of the PUF, revealing to the outside world only indirect information derived from the output,

---

[1] In general, the 'answer' is the result of cryptographic operations involving the PUF response. For details on secure protocols we refer to [6, 7, 9].

EXHIBIT A e.g. an encryption or hash. This control layer substantially strengthens the security, since an attacker cannot probe the PUF at will and cannot interpret the responses. CPUFs allow for new applications such as 'certified execution' [6, 7] and 'certified measurement'.

1.3 Types of PUF / Physical Realizations

Several physical systems are known on which PUFs can be based. The main types are optical PUFs [3, 4], coating PUFs [7], silicon PUFs [8, 9] and acoustic PUFs [7]. In this paper we first discuss PUFs in general and then focus on optical PUFs.

Optical PUFs consist of a transparent material containing randomly distributed scattering particles. Their suitability as a carrier of secret key material derives from the uniqueness and unpredictability of speckle patterns that result from multiple scattering of laser light in a disordered optical medium [5]. The challenge can be e.g. the angle of incidence, focal distance or wavelength of the laser beam, a mask pattern blocking part of the laser light, or any other change in the wave front. The output is the speckle pattern. As the speckle pattern contains many randomly distributed bright and dark patches, a high-entropy bit-string can be extracted from it, using a modest amount of image analysis. Physical copying of optical PUFs is difficult for two reasons: (i) The light diffusion obscures the locations of the scatterers. At this moment the best physical techniques can probe diffusive materials up to a depth of approximately 10 scattering lengths [10]. (ii) Even if all scatterer locations are known, precise positioning of a large number of scatterers is very hard and expensive, and requires a production process different from the original randomized process. *Modeling*, on the other hand, is difficult due to the inherent complexity of multiple coherent scattering [11]. Even the 'forward' problem turns out to be hard. Given the details of all the scatterers, the fastest known computation method of a speckle pattern is the transfer-matrix method [12]. It requires in the order of $(A/\lambda^2)^3 d/\lambda$ operations (where $A$ is the illuminated area, $\lambda$ the wavelength and $d$ the PUF thickness), which is larger than $10^{20}$ even if rather conservative values are chosen for $A$, $\lambda$ and $d$.

1.4 The Robustness Problem

The main problem facing any non-digital data storage mechanism is reproducibility. Due to the inherent noisiness of physical measurements, a readout will never yield exactly the same result.

1. For uncontrolled PUFs the external reader that challenges the PUF and detects the response during the verification phase can be a different device than the one that was used in the enrollment phase. Alignment and sensitivity differences between readers give rise to noise, unless great pains are taken to enforce very small mechanical and/or electrical tolerances. However, the potential number of readers is enormous, making such a standardisation impractical and expensive. Hence, the inter-device deviations give an important contribution to the noise in the readout of uncontrolled PUFs.

EXHIBIT A

2. Even repeated measurements with the same challenging and detection device do not give identical results. Time dependent external influences like temperature, moisture, vibrations, stray light, stray fields etc. can have an impact on the measurements.
3. The PUF itself is not immutable. It can accidentally get damaged. Another problem is spontaneous degradation. Most materials slowly change over time due to chemical reactions, friction and repeated thermal deformations. The rate of drifting determines the lifetime of the key material in the PUF.

Robustness can be achieved in two ways, which are best combined: (a) Reducing the noise at the source, and (b) Given a certain level of noise, extracting as much robust key material as possible by properly choosing an error correction algorithm. In Section 2 general measures are discussed to achieve both these goals. They apply to all types of PUF. The methods in Sections 2.3 and 2.4 are new. In Section 3 we present noise reduction methods for optical PUFs. In Section 4 we show experimental results on key extraction in the case of optical PUFs.

2 Key Extraction from Noisy Data

2.1 Shielding Functions

Generally speaking a key extraction algorithm is built on a Secret Extraction Code [13] or, equivalently, a Fuzzy Extractor[2] [14]. For the sake of simplicity we describe the algorithm in terms of a *shielding function* [16], which generates a special set of Secret Extraction Codes, while having all the necessary properties. We denote the analog PUF response to a challenge $C$ during the enrollment phase by $R \in \mathbb{R}^n$ and during the verification phase by $R' \in \mathbb{R}^n$. A function $G : \mathbb{R}^n \times \mathcal{W} \to \{0,1\}^k$ is called $\delta$-contracting if for all $R$ there exists at least one element $W_C \in \mathcal{W}$ and $K \in \{0,1\}^k$ such that $G(R', W_C) = G(R, W_C) = K$ for all $R'$ that lie within a sphere with radius $\delta$ around $R$ (i.e. $\|R' - R\| \leq \delta$). We use $\delta$-contracting functions to extract keys $K = G(R, W_C)$ from noisy data $R$ using *helper data* $W_C$.

The function $G(\cdot, \cdot)$ is called 'versatile' if the sets $S_G(R) = \{K \in \{0,1\}^k \mid \exists W_C$ such that $G(R, W_C) = K\}$ are sufficiently large for sufficiently many $R$.

A function $G : \mathbb{R}^n \times \mathcal{W} \to \{0,1\}^k$ is called $\varepsilon$-revealing if $W_C$ leaks less than $\varepsilon$ bits on $K$ (in the information theoretic sense), i.e. $I(W_C; K) \leq \varepsilon$. An $(\varepsilon, \delta)$-shielding function $G : \mathbb{R}^n \times \mathcal{W} \to \{0,1\}^k$ is a function that is $\delta$-contracting, versatile and $\varepsilon$-revealing. It is used to extract a secret of length $k$ from the PUF response as follows.

- Enrollment Phase: The PUF is subjected to a challenge $C$ and the analog response $R$ is measured. Then a random key $K$ is chosen from $\{0,1\}^k$ and helper data $W_C$ is computed by solving $G(R, W_C) = K$ for $W_C$. The quadruplet $(ID_{PUF}, C, W_C, K)$ is then stored in a database.

---

[2] A special case of this construction was previously considered in [15] in the context of biometrics, where it was called a 'fuzzy commitment'.

EXHIBIT A

- Verification Phase: When the PUF is inserted into the reader the PUF's identity is sent to the Verifier. The Verifier chooses a random challenge $C$ from his database and sends it to the PUF together with the corresponding helper data $W_C$. Then the reader subjects the PUF to the challenge $C$ and measures its response $R'$. The reader computes a key $K' = G(R', W_C)$.

It follows from the $\delta$-contracting property of the function $G$ that $K' = K$ if $R'$ is sufficiently close to $R$.

In the case of analog outputs, $G(\cdot, \cdot)$ will typically comprise a quantisation procedure. If the strings obtained after quantisation are uniformly distributed, the distilled keys $K$ can be used securely (the helper data leaks no information on $K$). However, if those strings are not uniformly distributed, a privacy amplification like step, e.g. based on universal hash functions, has to be applied to obtain a (shorter) key about which the adversary has only a negligible amount of information.

2.2 Example Algorithm

In order to illustrate the above definitions we present an example based on an Error Correcting Code $\mathcal{E}$. The algorithm makes use of so-called 'robust components', which are parts of the PUF response that are observed to be relatively insensitive to noise during enrollment. These are e.g. parts of the analog response $R$ whose magnitude exceeds a certain threshold, or parts that do not strongly vary when the measurement is repeated a number of times. By A/D converting $R$, a 'raw' bit-string $b$ is obtained. Substrings in $b$ that correspond to robust components in $R$ are referred to as 'robust bits'.

- Enrollment Phase: The PUF is subjected to a challenge $C$. The analog output is converted into a bit-string $b$. Robust components are determined, and a set $\mathcal{I}$ is constructed, consisting of indices pointing at the locations of the robust bits in $b$. The so-called *robust bit string* $X$ is obtained by concatenating the robust bits. Then a *secret* key $K$ is randomly generated and encoded to a code word $S_K \in \mathcal{E}$. The difference $W = X \oplus S_K$ is computed. The total set of helper data consists of the set $\mathcal{I}$ and the string $W$. The Verifier stores $(ID_{PUF}, C, \mathcal{I}, W, K)$.
- Verification Phase: When the PUF is inserted into the reader the PUF's identity is sent to the Verifier. The Verifier chooses a random challenge $C$ from his database and sends it to the reader together with the corresponding helper data $\mathcal{I}, W$. The reader subjects the PUF to the challenge $C$ and converts the analog response $R'$ into a bit-string $b'$. It uses the helper data indices $\mathcal{I}$ to select bits from $b'$, yielding a bit-string $X'$. It uses the second part of the helper data, $W$, to compute $S' = X' \oplus W = (X' \oplus X) \oplus S_K$. Finally, it employs $\mathcal{E}$ to correct any errors present in $S'$.

Clearly, if the number of errors is not too large ($X' \approx X$) then the error-correcting code will properly correct $S'$ into $S_K$ and yield $K$ after decoding. Note that the $\delta$-contracting property arises from the error correcting capacity of

EXHIBIT A $\mathcal{E}$, while the $\varepsilon$-revealing property follows from the fact that the secret $S_K$ gets masked by the random variable $X$.

2.3 Calibration CRPs

In uncontrolled PUFs, the main source of noise is misalignment of the challenging apparatus. We describe a method to reduce this misalignment. A small number of CRPs is reserved for calibration purposes, and is never used for identification. The protocol works as follows.

- Enrollment of Calibration CRPs: In addition to the 'ordinary' enrollment, a number of *Calibration CRPs* $(C_{\text{cal}}, r_{\text{cal}})$ is measured and stored. (Here the notation $r_{\text{cal}}$ stands for information about the response in general; $r_{\text{cal}}$ does not have to be of the same type as the 'ordinary' response information that is stored for identification purposes). The Calibration CRPs have no challenges in common with the 'ordinary' CRPs. The Calibration CRPs are not secret and hence they can be stored in a publicly accessible way, e.g. next to the PUF.
- Use of Calibration CRPs in the Verification Phase: A PUF is inserted into a reader. The reader reads $\text{ID}_{\text{PUF}}$ and acquires a Calibration CRP $(C_{\text{cal}}, r_{\text{cal}})$ corresponding to $\text{ID}_{\text{PUF}}$. (This CRP is obtained e.g. by reading it from the smart-card which contains the PUF, or the CRP is sent by the Verifier). The PUF is subjected to the challenge $C_{\text{cal}}$, and the response $r'_{\text{cal}}$ is measured. Based on the difference between $r'_{\text{cal}}$ and $r_{\text{cal}}$, the alignments of the reader are adjusted. The process of measuring the response to $C_{\text{cal}}$ and adjustment is repeated until the difference between $r'_{\text{cal}}$ and $r_{\text{cal}}$ is reduced to an acceptable level. Only if this level is reached, the Verifier sends a challenge $C$ intended for identification purposes, and the 'real' identification protocol as described in Section 1.2 starts running.

There are ways to improve this method. One option is to choose the calibration challenges such that identification challenges are never extremely far away from a calibration point. In this way the error introduced by moving away from a calibration point is reduced. Another option is to subdivide the process of looking for the correct settings into several stages: First a coarse search with low discriminating power, and then a finer search. In optical PUFs, the discriminating power can be adjusted by changing the laser beam diameter. The sensitivity to noise decreases with increasing beam diameter.

The search can be accelerated by storing additional 'perturbed' responses during enrollment. Pairs $\{\Delta_i, R_{\text{cal}}(m - \Delta_i)\}$ are stored together with the CRP $(C_{\text{cal}}, R_{\text{cal}}(m))$, where $m$ denotes the correct settings of the reader, and $\Delta$ a small perturbation. When, during the search, a response matches $R_{\text{cal}}(m - \Delta_i)$, the reader knows that its settings must be adjusted by an amount $\Delta_i$.

2.4 Two-Way Use of Helper Data

In all schemes discussed so far, helper data is generated during enrollment and applied at the time of verification. However, the measuring device is capable of

EXHIBIT A producing helper data also in the verification phase. Instead of discarding this extra information, one can use it to improve the robustness of the extracted keys. We present an interactive protocol in which the robust components obtained from enrollment and verification are combined using an 'AND' operation.

- Enrollment: The Verifier subjects the PUF to a challenge $C$ and converts the analog response $R$ to a bit-string $b$. He determines robust components and constructs the helper data set $\mathcal{I}$ of pointers to the robust parts of $b$. He stores $(\text{ID}_{\text{PUF}}, C, \mathcal{I}, b)$.
- Verification: The PUF is inserted into the reader and the reader sends $\text{ID}_{\text{PUF}}$ to the Verifier. The Verifier sends $C$ and $\mathcal{I}$. The reader challenges the PUF with $C$ and measures a response $R'$, which it converts into a bit-string $b'$. It determines the robust components of $R'$ and constructs new helper data $\mathcal{I}'$. It sends $\mathcal{I}'$ to the Verifier. Both the reader and the Verifier now compute the *combined helper data* $\mathcal{J} = \mathcal{I} \cap \mathcal{I}'$. The Verifier computes $X = b_{\mathcal{J}}$, while the reader computes $X' = b'_{\mathcal{J}}$. (The notation $b_{\mathcal{J}}$ indicates that only those bits are selected from $b$ that are indicated in $\mathcal{J}$). Finally, $X$ and $X'$ are used for the construction of a secret key, e.g. using the algorithm described in Section 2.2.

An analysis of error probabilities and key lengths is presented in Appendix A. It turns out (see Eqs. 5,6) that the bit error probability in $X'$ is drastically improved compared to the 'one way' case, where only the enrolled helper data is used ($X_{1\text{way}} = b_{\mathcal{I}}$; $X'_{1\text{way}} = b'_{\mathcal{I}}$). As a consequence, the amount of computational effort spent on the error correction using $\mathcal{E}$ is greatly reduced (linear in the number of correctible errors). Furthermore, it turns out that the extracted keys are longer because fewer redundancy bits are needed (see Eq. 8). For a reasonable choice of parameters, the improvement in bit error probability in $X'$ can be as small as a factor 5 and as large as 50. The simultaneous improvement in key length varies between 20% and 70%. The difference between the two methods is most pronounced when the measurements are very noisy.

3 Noise Reduction for Optical PUFs

3.1 'Pyramid' Structure

In Fig. 1 we present an elegant way of detecting misalignments between an optical PUF and a camera. At the bottom of the PUF, a small pyramid-shaped volume is removed. When the laser beam enters the PUF, a fraction of the light reaches the bottom without being scattered by the random particles. There a certain fraction reflects off the pyramid structure and is divided into four sub-beams. These beams are partially transmitted through the PUF without scattering, and give rise to four bright spots on the camera. The spots are superimposed on the speckle pattern. Misalignments (translations and rotations in all directions) can be uniquely read off from the relative positions of the four spots (see Fig. 1 a–d). This allows the reader to adjust its settings.

EXHIBIT A

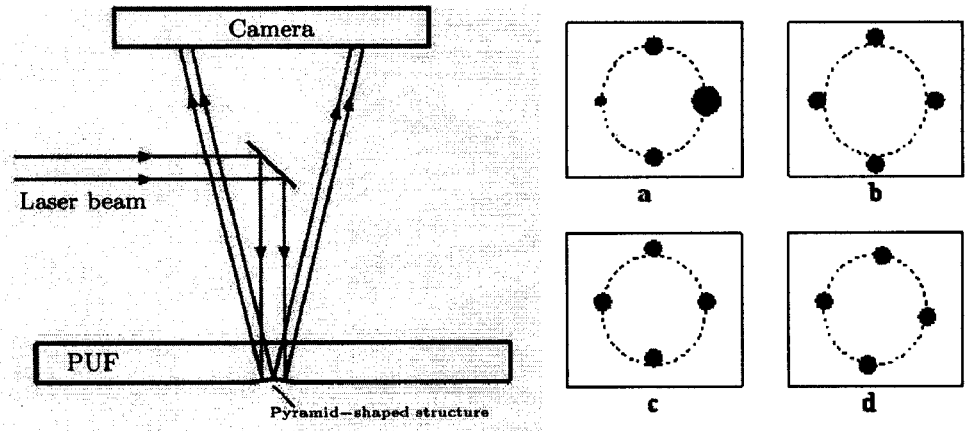

Fig. 1. Left: Light scattering from the pyramid structure. Right: Effects of misalignment. (a) Shift in $x$-direction. (b) Shift in $z$-direction. (c) Rotation around the $x$-axis. (d) Rotation around the $z$-axis.

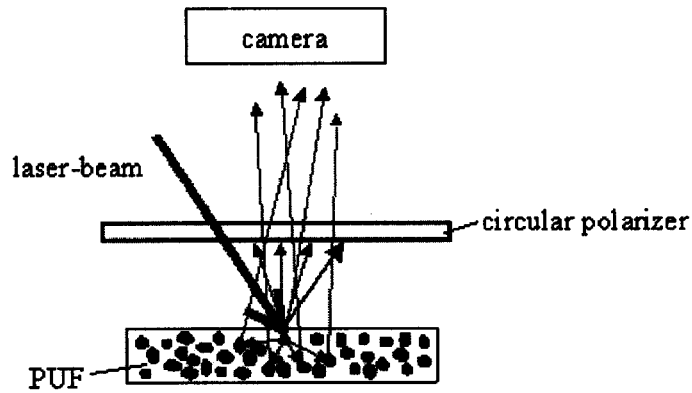

Fig. 2. Circular polariser blocking light that reflects directly from the top of the PUF.

3.2 Polarisation Selection

The noise due to scratches and dirt on the surface of an optical PUF can be reduced by making use of the fact that light changes its polarisation when it is reflected. The method works as follows. We assume a geometry as in Fig. 2. When the laser light is generated, it has *linear* polarisation. On its way to the PUF the beam passes through a *circular* polariser. Light that gets scattered from the top of the PUF, without entering it, will have reversed circular polarisation and hence will be absorbed when it meets the polariser again. Light that enters the PUF, however, is subjected to multiple scattering, which has a depolarising effect. Hence, a substantial fraction of the multiply scattered light will pass the polariser and reach the camera. In this way, direct reflection from scratches and dirt is eliminated. In order to improve the selectivity, one can add an additional

EXHIBIT A quarter wave plate on top of the PUF; passing through it twice precisely negates the polarisation-reversing effect of a reflection.

4 Experimental Results for Optical PUFs

We show experimental results that demonstrate the effectiveness of helper data in the form of robust components. The algoritm of Section 2.2 was applied, without making use of the techniques decribed in Sections 2.3, 2.4 and 3. We used the following setup. The laser is a DBF laser with a wavelength of 785 nm (spectral width 1nm). The beam diameter is 1 mm. We have used five scattering samples with a thickness of 0.4 mm. Pictures of the reflected speckle pattern are taken with a 1024 by 768 pixel CCD camera with a pixel pitch of 6.25 mm. The bitmap has 256 gray levels. The distance between the laser and the sample is 10 cm, and the distance from the sample to the camera is 13 cm.

4.1 Binarized Gabor Coefficients

In order to extract bit strings from speckle images we have used the method of Gabor Transforms as proposed in [3]. Gabor Transforms are well suited since they are insensitive to small changes in an image and they reveal the locations as well as the orientations of structures at different spatial frequencies. They are used in a wide range of applications, such as iris recognition [17], texture analysis and image enhancement, coding and compression.

A two-dimensional Gabor basis function $\Gamma(s, k, x_0, x)$ is the product of a plane wave with wave vector $k$ and a Gaussian centered on $x_0$ with width $s$. ($x$ denotes a location in the speckle image). We write the Gabor basis functions $\Gamma$ and the Gabor coefficients $G$ as follows.

$$G_{\text{IM}}(s, k, x_0) = \int d^2x \, \Gamma_{\text{IM}}(s, k, x_0, x) I(x) \qquad (1)$$

$$\Gamma_{\text{IM}}(s, k, x_0, x) = \frac{1}{s\sqrt{2\pi}} \sin k \cdot (x - x_0) \exp[-\frac{(x - x_0)^2}{4s^2}]. \qquad (2)$$

Here $I$ denotes the light intensity. We have selected the imaginary part of the transform, since it is invariant under spatially constant shifts of $I$. In the notation of Section 2, a bitmap image of a speckle pattern corresponds to the 'raw' bit-string $b$. The 'robust' bit-string $X$ is obtained as follows. Gabor coefficients $G_{\text{IM}}$ are evaluated for a set of parameters $s$, $k$, $x_0$. Coefficients are discarded if they do not exceed a certain threshold $T$, i.e. one only keeps $|G_{\text{IM}}| > T$. Finally, the robust coefficients are binarized; positive values are mapped to '1' and negative to '0'.

Attention must be paid to the fact that Gabor coefficients can be strongly correlated. Ideally one should construct a bit-string from values that are almost independent. In general, correlations between $G_{\text{IM}}(s, k, x_0)$ and $G_{\text{IM}}(s', k', x_0')$ occur when their parameters do not differ much. Correlations also occur if $|x_0' - x_0|$ is smaller than the speckle size. An analysis of these correlations is presented in

EXHIBIT A

Appendix B. For simplicity we have used the following parameters in our experiments: A single Gaussian width $s = 13$ pixels, a single length $|k| = \pi/8$ pixels$^{-1}$, two directions of $k$ (45° and 135°), and $x_0$ positions in a square grid with a spacing of 8 pixels. This yields 2400 Gabor coefficients. There are very strong correlations ($\approx 0.9$) between diagonal neighbours on the $x_0$-grid when $k \parallel k'$ and $(x_0' - x_0) \perp k$. Furthermore, there are strong anti-correlations ($\approx -0.7$) between diagonal neigbours when $k$, $k'$ and $(x_0' - x_0)$ point in the same direction. Other correlations are zero or negligible. This explains the stripes in Fig. 3.

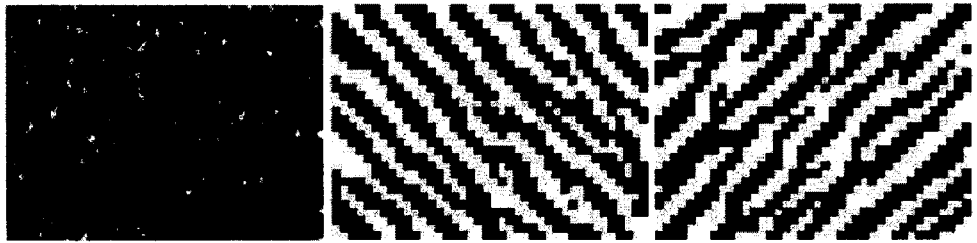

Fig. 3. Left: Example of a speckle pattern. Middle: Binarized Gabor coefficients at 45°. Right: Binarized Gabor coefficients at 135°.

The robustness threshold $T$ was chosen such that in the enrollment phase there are always more than 1023 Gabor coefficients exceeding the threshold. We have used a BCH code with parameters (1023, 56, 191), i.e. 1023-bit code words, 56-bit message words (the actual key length), and correction of 191 errors. The high error-correcting capacity is necessary because the bit error rate (BER) in the robust bit-string $X'$ is still high when no special measures are taken to reduce the noise. Without showing proof we mention that the Calibration CRP method reduces the BER to $< 5\%$, allowing for a BCH code with parameters (1023,553,52), i.e. robust 553-bit message words. Note, however, that the actual information content (entropy) is lower than 553 bits due to the strong correlations between the Gabor coefficients (see Appendix B).

The statistics of the Gabor coefficients is the subject of ongoing research.

4.2 Experimental Results

Fig. 3 shows a typical speckle pattern and the binarized Gabor coefficients. We studied the sensitivity of the binarized coefficients as well as the selected robust coefficients under small rotations and translations. All measurements were repeated ten times (re-inserting the samples each time) and averaged over these ten instances. As a direct measure of the difference between two speckle patterns $B_1, B_2$ we use the correlation $C_{\text{bmp}} \in [-1, 1]$ between the bitmaps, $$C_{\text{bmp}} = \frac{\langle B_1(x_i) B_2(x_i) \rangle_i - \langle B_1(x_i) \rangle_i \langle B_2(x_i) \rangle_i}{\sigma_1 \sigma_2} \quad (3)$$

EXHIBIT A

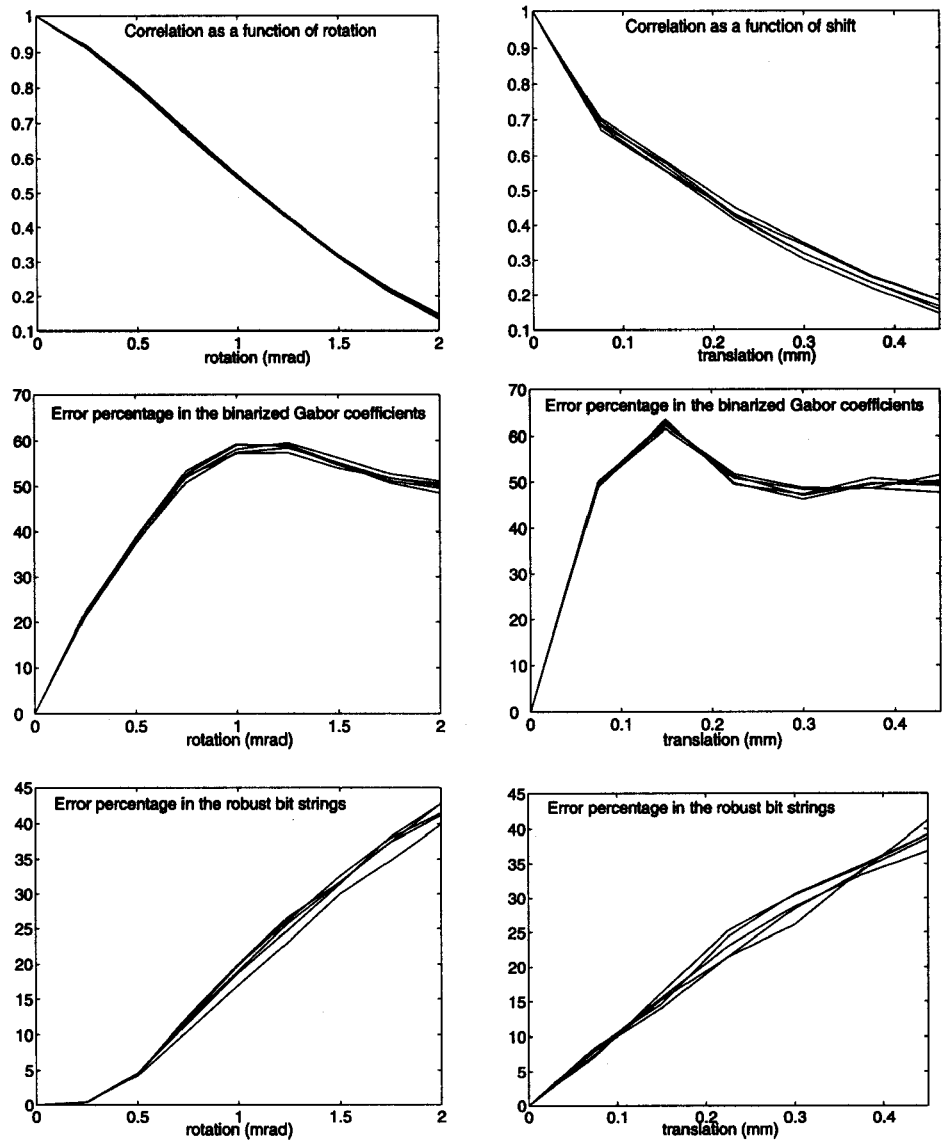

Fig. 4. Effects of misalignment. The five curves correspond to different samples. Left: Tilting of the laser beam. Right: Shift of the sample. From top to bottom: Correlation between original and perturbed speckle pattern; Error percentage in the binarized Gabor coefficients (2400-bit string); Error percentage in the selected robust bit-string (>1023 bits).

where $\langle \cdot \rangle_i$ denotes the spatial average and $\sigma$ is the standard deviation in the gray level of the speckle pattern. The results of the measurements are shown in Fig. 4. The graphs show that for rotations larger than 0.7 mrad and shifts larger than 0.1 mm, the binarized coefficients look completely independent (50% errors). The robust bits, however, are significantly more resilient: There the BER level of 50% is reached only at rotations > 2mrad and shifts > 0.5mm. This demonstrates the usefulness of robust components as a form of helper data.

Acknowledgements

We thank Marten van Dijk, Vincent van der Leest, Sjoerd Stallinga and Ton Akkermans for useful discussions.

References

1. K.M. Tolk, *Reflective Particle Technology for Identification of Critical Components*, 33rd Annual Meeting Proceedings of the Institute of Nuclear Materials Management, July 1992.
2. Unicate BV's '3DAS' system,
   http://www.andreae.com/Unicate/Appendix%201.htm, 1999.
3. R. Pappu, *Physical One-Way Functions*, Ph.D. thesis, MIT 2001.
4. R. Pappu, B. Recht, J. Taylor, N. Gershenfeld, *Physical One-Way Functions*, Science Vol. 297, p.2026, Sept 2002.
5. P. Tuyls, B. Škorić, S. Stallinga, A.H.M. Akkermans, W. Ophey, *Information-Theoretic Security Analysis of Physical Uncloneable Functions*, Proc. Financial Cryptography and Data Security 2005.
6. B. Gassend, D. Clarke, M. van Dijk, S. Devadas, *Controlled Physical Random Functions*, Proc. 18th Annual Computer Security Applications Conf., Dec. 2002.
7. P. Tuyls, B. Škorić, *Secret Key Generation from Classical Physics*, Proceedings of the Hardware Technology Drivers for Ambient Intelligence Symposium, Philips Research Book Series, Kluwer, 2005.
8. B. Gassend, D. Clarke, M. van Dijk, S. Devadas *Silicon Physical Random Functions*, Proc. 9th ACM Conf. on Computer and Communications Security, 2002.
9. B. Gassend, *Physical Random Functions*, Master's Thesis, MIT 2003.
10. M. Magnor, P. Dorn, W. Rudolph, *Simulation of confocal microscopy through scattering media with and without time gating*, J.Opt.Soc.Am. B, Vol. 19, no. 11 (2001), 1695–1700.
11. J. F. de Boer, *Optical Fluctuations on the Transmission and Reflection of Mesoscopic Systems*, Ph.D. thesis, 1995, Amsterdam.
12. H. Furstenberg, *Noncommuting Random Matrices*, Trans. Am. Math. Soc. 108, 377, 1963.
13. P. Tuyls, J. Goseling, *Capacity and Examples of Template Protecting Biometric Authentication Systems*, Biometric Authentication Workshop (BioAW 2004), LNCS 3087, 158–170, Prague, 2004.
14. Y. Dodis, L. Reyzin, A. Smith, *Fuzzy Extractors: How to generate strong secret keys from biometrics and other noisy data*, in Advances in Cryptology – Eurocrypt'04, LNCS 3027, 523–540, 2004.
15. A. Juels, M. Wattenberg, *A Fuzzy Commitment Scheme*, in G. Tsudik, ed., Sixth ACM Conference on Computer and Communications Security, 28–36, ACM Press. 1999.

EXHIBIT A

16. J.P. Linnartz, P. Tuyls, *New Shielding Functions to enhance Privacy and Prevent Misuse of Biometric Templates*, Proc. 4th International Conference on Audio and Video based Biometric Person Authentication, LNCS 2688, Guildford UK, June 9-11, 2003.
17. J. Daugman, *The importance of being random; statistical principles of iris recognition*, Pattern Recognition 36, 279–291, 2003.
18. J. W. Goodman, *Statistical properties of laser speckle patterns*, in Laser Speckle and Related Phenomena, 2nd ed., J. C. Dainty, Ed. New York: Springer-Verlag, 1984.

A  Two-Way Use of Helper Data

In this Appendix we use a simple model to analyse the effects of using the helper data that is generated during the verification phase as proposed in Section 2.4. We consider the measurement of $n$ variables $x_1, \ldots, x_n$, representing the PUF response, which are independent and identically distributed according to a normal distribution with zero mean and standard deviation $\Sigma_x$. (This is sometimes called the 'inter-class' variation). The measurement error due to misalignment and external noise is assumed to be independently Gaussian distributed with standard deviation $\sigma$ ('intra-class' variation). If the enrollment measurement yields a value $f$, with absolute value larger than some threshold $T$, the value is deemed 'robust'. We compute the probability $P_{\text{robust}}$ of finding a robust value when a noisy measurement is done of a variable $x_i$, given that the 'noiseless' value of $x_i$ is *unknown*. We have to take the inter-class variation into account and hence average over $x_i$, $$P_{\text{robust}} = 1 - \int_{-T}^{T} df \int_{-\infty}^{\infty} dx\, N_{0\Sigma_x}(x) N_{x\sigma}(f) = 1 - \text{Erf} \frac{T}{\sqrt{2}\sqrt{\Sigma_x^2 + \sigma^2}}. \quad (4)$$

Here the notation $N_{\mu s}$ stands for the normal distribution with mean $\mu$ and standard deviation $s$, and Erf denotes the Error Function. Given a robust measured $f$, the probability $P_1$ that a bit flip will occur in the second measurement, according to the one-way method, is equal to the probability that the second measurement yields a number $F$ with sign opposite from $f$. Taking $f > 0$ without loss of generality, this probability is $$P_1 = \int_{-\infty}^{\infty} dx\, N_{f\sigma}(x) \int_{-\infty}^{0} dF\, N_{x\sigma}(F) = \frac{1}{2} - \frac{1}{2}\text{Erf}\frac{f}{2\sigma}. \quad (5)$$

The first integral in (5) is an average over all the possibilities for the unknown 'true' value $x$. Given the fact that $f$ was obtained in the first measurement, $x$ is Gaussian-distributed around $f$, with standard deviation given by the noise strength $\sigma$.

On the other hand, if the two-way helper data method is used, the probability of a bit flip ($P_2$) is equal to the probability that $F$ not only has opposite sign, but also has absolute value larger than the threshold $T$,

EXHIBIT A $$P_2 = \int_{-\infty}^{\infty} dx \, N_{f\sigma}(x) \int_{-\infty}^{-T} dF \, N_{x\sigma}(F) = \frac{1}{2} - \frac{1}{2}\mathrm{Erf}\frac{f+T}{2\sigma}. \qquad (6)$$

The amount of computational effort that has to be spent on error-correcting codes is roughly linear in the expected number of errors. Hence we are interested in the expectation values $\langle P_1 \rangle$ and $\langle P_2 \rangle$, where the brackets denote averaging with respect to $f$ (with $f \geq T$). Making a natural choice for the parameters, $\sigma < T < 2\sigma$ and $\Sigma_x > \sigma$, it turns out that the ratio $\langle P_1 \rangle / \langle P_2 \rangle$ lies in a range between approximately 5 and 50 (increasing with $T/\sigma$), indicating that the two-way method gives a huge reduction of the computational cost of using the error-correcting code $\mathcal{E}$.

One may worry that the two-way method yields shorter keys, as more bits are being discarded in the establishment of the robust bit-string $X'$. We show that, on the contrary, longer keys are extracted. In the one-way method, a variable $x_i$ that has been found to be robust at enrollment ($f > T$) is always kept. In the two-way method there is a nonzero probability $P_{\mathrm{discard}}$ of discarding such a variable, $$P_{\mathrm{discard}} = \int_{-\infty}^{\infty} dx \, N_{f\sigma}(x) \int_{-T}^{T} dF \, N_{x\sigma}(F) = \frac{1}{2}\mathrm{Erf}\frac{f+T}{2\sigma} - \frac{1}{2}\mathrm{Erf}\frac{f-T}{2\sigma}. \qquad (7)$$

We denote the length of the robust string $X'$ in the one-way method as $n_1 = n \cdot P_{\mathrm{robust}}$. The corresponding length in the two-way case is $n_2 = n_1(1 - \langle P_{\mathrm{discard}} \rangle)$, i.e. shorter than $n_1$. However, it is well known that the information capacity of a channel strongly depends on the error rate of the channel. Given an error rate $p$, the information content per transmitted bit is $1 - h(p)$, with $h(p) = -p \log p - (1-p)\log(1-p)$. The maximum entropy $H$ of the derived key $K$ in the two methods is given by $$H_1 = n_1[1 - h(\langle P_1 \rangle)]; \qquad H_2 = n_2[1 - h(\langle P_2 \rangle)]. \qquad (8)$$

For given signal to noise ratio $\Sigma_x/\sigma$, an optimal choice of $T/\sigma$ exists (for each method separately) that yields the highest entropy. It turns out that the best $H_2$ is always larger than the best $H_1$. The difference between the two methods is most pronounced at small $\Sigma_x/\sigma$, i.e. noisy measurements.

B   Correlations Between Gabor Coefficients

In this Appendix we compute the correlation between the Gabor coefficients (1). We use the shorthand notation $G_{\mathrm{IM}} = G_{\mathrm{IM}}(s, k, x)$ and $G'_{\mathrm{IM}} = G_{\mathrm{IM}}(s', k', x')$. By $\sigma_G$ and $\sigma'_G$ we denote the standard deviation of $G_{\mathrm{IM}}$ and $G'_{\mathrm{IM}}$ respectively. We define the correlation $C_G \in [-1, 1]$ as $$C_G := \frac{\langle G_{\mathrm{IM}} G'_{\mathrm{IM}} \rangle - \langle G_{\mathrm{IM}} \rangle \langle G'_{\mathrm{IM}} \rangle}{\sigma_G \sigma'_G} = \frac{\langle G_{\mathrm{IM}} G'_{\mathrm{IM}} \rangle}{\sqrt{\langle (G_{\mathrm{IM}})^2 \rangle \langle (G'_{\mathrm{IM}})^2 \rangle}}. \qquad (9)$$

The brackets denote averaging over speckle patterns. For the last equality we have used the fact that $\Gamma_{\mathrm{IM}}$ (2) is an odd function of $x$, which leads to $\langle G_{\mathrm{IM}} \rangle = 0$

EXHIBIT A regardless of the choice of parameters. For the computation of the expectation values we use a result from [18], $$R(x_1, x_2) := \langle I(x_1)I(x_2)\rangle = 4\left[\frac{J_1(|x_2 - x_1|/M)}{|x_2 - x_1|/M}\right]^2 \qquad (10)$$

where $J_1$ is a Bessel function and $M$ is a constant proportional to the average speckle size, $M = \lambda z/(2\pi W)$, with $\lambda$ the wavelength, $z$ the distance between the exit plane of the PUF and the detector, and $W$ the diameter of the illuminated area of the PUF. Substitution of (10) and (2) into (9) gives $$\frac{\langle G_{\text{IM}} G'_{\text{IM}}\rangle}{\langle I\rangle^2} = \int \frac{d^2 x_1 d^2 x_2}{2\pi s s'} R\, e^{-\frac{(x_1-x)^2}{4s^2} - \frac{(x_2-x')^2}{4s'^2}} \sin k \cdot (x_1 - x)\sin k' \cdot (x_2 - x'). \qquad (11)$$

We introduce 'center of mass' coordinates as follows, $$\begin{aligned}
x &= \bar{x} - \tfrac{1}{2}\Delta & &; & x' &= \bar{x} + \tfrac{1}{2}\Delta \\
x_1 &= m - \tfrac{1}{2}\delta & &; & x_2 &= m + \tfrac{1}{2}\delta \\
k &= K - \tfrac{1}{2}\zeta & &; & k' &= K + \tfrac{1}{2}\zeta \\
1/s^2 &= p - \tfrac{1}{2}q & &; & 1/s'^2 &= p + \tfrac{1}{2}q
\end{aligned} \qquad (12)$$

In terms of these coordinates, the expectation value (11) can be expressed as $$\langle G_{\text{IM}} G'_{\text{IM}}\rangle = \frac{\langle I\rangle^2}{\pi s s'}\int d^2\delta\, \left[\frac{J_1(\delta/M)}{\delta/M}\right]^2 \exp[-\tfrac{p}{8}(\delta - \Delta)^2] \qquad (13)$$

$$\int d^2m\, \exp[-\tfrac{p}{2}m^2 - \tfrac{q}{4}m\cdot(\delta - \Delta)]$$

$$\times \left\{\cos[K\cdot(\delta - \Delta) + \zeta\cdot m] - \cos[2K\cdot m + \tfrac{1}{2}\zeta\cdot(\delta - \Delta)]\right\}.$$

Here we have assumed, without loss of generality, that $\bar{x} = 0$. The $m$-integral is readily evaluated, yielding $$\langle G_{\text{IM}} G'_{\text{IM}}\rangle = \frac{2\langle I\rangle^2}{p s s'}\int d^2\delta\, \left[\frac{J_1(\delta/M)}{\delta/M}\right]^2 \exp[-(\tfrac{p}{8} - \tfrac{q^2}{32p})(\delta - \Delta)^2]$$

$$\times \left\{e^{-(1/2p)\zeta^2}\cos[(K - \tfrac{q}{4p}\zeta)\cdot(\delta - \Delta)]\right.$$

$$\left. - e^{-(2/p)K^2}\cos[(\tfrac{1}{2}\zeta - \tfrac{q}{2p}K)\cdot(\delta - \Delta)]\right\}. \qquad (14)$$

The $\delta$-integral cannot be evaluated analytically. Several trends can be observed, however. The integrand contains a rapidly decreasing function of $\delta$ centered around $\delta = 0$, with scale $M$, times another rapidly decreasing function of $\delta$ centered around $\Delta$, with scale $\approx s$. Hence, if $\Delta$ is larger than $\min(M, s)$, then the expectation value (14) becomes very small. Furthermore, it can also be seen that the $\delta$-integral becomes small when $\zeta^{-1} \ll \min(M, s)$, because then the oscillations cancel each other.

EXHIBIT A

We make an approximation by writing $4[J_1(u)/u]^2 \approx \exp(-u^2/2\Sigma^2)$, with $\Sigma \approx 1.29$. This makes the $\delta$-integral manageable and nicely captures the decay of the integrand between $u = 0$ and $u \approx 3.83$ where $J_1(u) = 0$, but the asymptotic behaviour at large $u$ is misrepresented. Hence, the approximation is useful for small $\Delta$. We present the result for $s' = s$:

$$C_{\rm G}(s'=s) \approx \exp\left[-\frac{1}{2} \cdot \frac{\Delta^2}{M^2\Sigma^2 + 4s^2}\right] \times \quad (15)$$

$$\frac{e^{\Gamma s^2 \boldsymbol{k}\cdot\boldsymbol{k}'}\cos\frac{\Gamma}{2}\boldsymbol{\Delta}\cdot(\boldsymbol{k}'+\boldsymbol{k}) - e^{-\Gamma s^2 \boldsymbol{k}\cdot\boldsymbol{k}'}\cos\frac{\Gamma}{2}\boldsymbol{\Delta}\cdot(\boldsymbol{k}'-\boldsymbol{k})}{2\sqrt{\sinh\Gamma s^2 k^2}\sqrt{\sinh\Gamma s^2 k'^2}}$$

where $\Gamma \in [0,1]$ is defined as $\Gamma = [1 + M^2\Sigma^2/(4s^2)]^{-1}$.

EXHIBIT A

We claim:

1. A method comprising the acts:
   sending challenge data from a first device to a second device;
   at the second device, obtaining response data by reference to said challenge data and a physical object, wherein said obtaining includes capturing reflected non-coherent illumination from the object with a 2D photosensor to produce image data, and processing said image data; and
   checking said response data against expected data to produce result data;
   wherein said result data is not dependent on a particular placement of an illumination source relative to both the 2D photosensor and the physical object.

2. The method of claim 1 in which said capturing comprises capturing with a 2D optical sensor in a portable phone.

3. The method of claim 1 that includes maintaining a list of used challenge data, and checking candidate challenge data against said list.

4. The method of claim 1 in which said obtaining includes processing the image data in accordance with the challenge data to yield the response data.

5. The method of claim 1 in which the physical object is a planar card.

6. A method comprising the acts:
   sending challenge data from a first device to a second device;
   at the second device, obtaining response data by reference to said challenge data and a physical object, said obtaining including capturing image data from the object with a 2D photosensor; and
   checking said response data against expected data to produce result data;
   wherein said result data is not dependent on a particular placement of an illumination source relative to both the 2D photosensor and the physical object, and the method further includes determining the relative orientation between said object and said 2D photosensor by reference to said captured image data.

7. The method of claim 6 in which said determining includes decoding a steganographically encoded signal from said captured image data.

8. The method of claim 6 in which said capturing comprises capturing with a 2D optical sensor in a portable phone.

9. The method of claim 1 wherein said result data is not dependent on a particular placement of an illumination source relative to the 2D photosensor.

10. The method of claim 1 wherein said result data is not dependent on a particular placement of an illumination source relative to the physical object.

11. The method of claim 6 wherein said result data is not dependent on a particular placement of an illumination source relative to the 2D photosensor.

12. The method of claim 6 wherein said result data is not dependent on a particular placement of an illumination source relative to the physical object.

13. The method of claim 1 in which said checking comprises checking at the first device.

14. The method of claim 6 in which said checking comprises checking at the first device.

15. A method comprising:
    producing response data responsive to a physical object and challenge data, said producing including capturing imagery from the physical object using a 2D photosensor, and processing said imagery; and
    sending said response data to a checking system that can check the response data against expected data;
    wherein said response data is not essentially dependent on a particular placement of an illumination source relative to both the 2D photosensor and the physical object.

16. The method of claim 15 wherein the physical object is illuminated with a non-coherent light source when capturing said imagery.

17. The method of claim 15 wherein said capturing comprises capturing with a 2D photosensor in a portable phone.

18. The method of claim 15 that includes checking the response data against said expected data to yield result data.

* * * * *

UNITED STATES PATENT AND TRADEMARK OFFICE
CERTIFICATE OF CORRECTION

| | | |
|---|---|---|
| PATENT NO. | : 8,224,018 B2 | Page 1 of 1 |
| APPLICATION NO. | : 11/739387 | |
| DATED | : July 17, 2012 | |
| INVENTOR(S) | : Rhoads et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1123 days.

Signed and Sealed this
Sixteenth Day of October, 2012

David J. Kappos
*Director of the United States Patent and Trademark Office*

UNITED STATES PATENT AND TRADEMARK OFFICE
CERTIFICATE OF CORRECTION

PATENT NO. : 8,224,018 B2
APPLICATION NO. : 11/739387
DATED : July 17, 2012
INVENTOR(S) : Rhoads et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1289 days.

Signed and Sealed this
First Day of January, 2013

David J. Kappos
*Director of the United States Patent and Trademark Office*